(12) United States Patent
Ahmad et al.

(10) Patent No.: US 9,501,708 B1
(45) Date of Patent: Nov. 22, 2016

(54) ADAPTIVE SLIDING WINDOWS FOR TEXT RECOGNITION

(71) Applicant: King Fahd University of Petroleum and Minerals, Dhahran (SA)

(72) Inventors: Irfan Ahmad, Dhahran (SA); Sabri A. Mahmoud, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 14/850,406

(22) Filed: Sep. 10, 2015

(51) Int. Cl.
*G06K 9/62* (2006.01)
*G06K 9/34* (2006.01)
*G06K 9/00* (2006.01)

(52) U.S. Cl.
CPC ........... *G06K 9/344* (2013.01); *G06K 9/00456* (2013.01); *G06K 9/00463* (2013.01)

(58) Field of Classification Search
CPC .................................................... G06K 9/6297
USPC ......................................................... 382/159
See application file for complete search history.

(56) References Cited

U.S. PATENT DOCUMENTS

| | | | | |
|---|---|---|---|---|
| 8,644,611 B2 * | 2/2014 | Natarajan | ........... | G06K 9/00865 382/186 |
| 2010/0246963 A1 * | 9/2010 | Al-Muhtaseb | ....... | G06K 9/6297 382/185 |

FOREIGN PATENT DOCUMENTS

WO    WO 2008/138356 A2    11/2008

OTHER PUBLICATIONS

Ahlam Maqqor, et al., "Using HMM Toolkit (HTK) for Recognition of Arabic Manuscripts Characters", http://ieeexplore.ieee.org/ielx7/6900112/6911126/06911316.pdf?tp=&arnumber=6911316&isnumber=6911126, 2014, 5 pages.

* cited by examiner

*Primary Examiner* — Manuchehr Rahmjoo
(74) *Attorney, Agent, or Firm* — Oblon, McClelland, Maier & Neustadt, L.L.P.

(57) ABSTRACT

A text-recognition system and method include a trained classifier configured to identify a font of a frame of text line image. The system also includes an adaptive sliding window configured to divide the frame into a plurality of cells. A first cell is located around a prominent writing line of the text line image. Additional cells are located above the prominent writing line and below the prominent writing line, such that each of the additional cells above the prominent writing line has a same percentage of ink-pixels and each of the additional cells below the prominent writing line has a same percentage of ink-pixels. The system also includes a font-specific feature parameters database configured for extraction of text features from each of the cells. The system also includes one or more trained font-specific recognizers configured to recognize the extracted text features using an associated font-specific recognizer for the identified font.

11 Claims, 16 Drawing Sheets

Fig. 1A

| no | S-alone | Term. | Medial | Initial | Shapes | Class |
|----|---------|-------|--------|---------|--------|-------|
| 1 | ء | ء | ء | ء | 1 | 1 |
| 2 | ا | ا | ا | ا | 2 | 2 |
| 3 | ا | ا | ا | ا | 2 | 2 |
| 4 | ۇ | ۇ | ۇ | ۇ | 2 | 2 |
| 5 | ا | ا | ا | ا | 2 | 2 |
| 6 | ى | ل | ئ | ئ | 4 | 3 |
| 7 | ا | ل | ل | ا | 2 | 2 |
| 8 | ڊ | ڊ | ڊ | ڊ | 4 | 3 |
| 9 | ة | ة | ة | ة | 2 | 2 |
| 10 | ڌ | ڌ | ڌ | ڌ | 4 | 3 |

Fig. 2A

| no | S-alone | Term. | Medial | Initial | Shapes | Class |
|----|---------|-------|--------|---------|--------|-------|
| 11 | ᠊ᠵ | ᠊ᠵ | ᠊ᠵ᠊ | ᠊ᠵ | 4 | 3 |
| 12 | ᠴ | ᠴ | ᠴ᠊ | ᠴ᠊ | 4 | 3 |
| 13 | ᠶ | ᠶ | ᠶ᠊ | ᠶ᠊ | 4 | 3 |
| 14 | ᠸ | ᠸ | ᠸ᠊ | ᠸ᠊ | 4 | 3 |
| 15 | ᠠ | ᠠ | ᠊ᠠ᠊ | ᠠ᠊ | 2 | 2 |
| 16 | ᠡ | ᠡ | ᠊ᠡ᠊ | ᠡ᠊ | 2 | 2 |
| 17 | ᠢ | ᠢ | ᠊ᠢ᠊ | ᠢ᠊ | 2 | 2 |
| 18 | ᠣ | ᠣ | ᠊ᠣ᠊ | ᠣ᠊ | 2 | 2 |
| 19 | ᠵ | ᠵ | ᠵ᠊ | ᠵ᠊ | 4 | 3 |
| 20 | ᠶ | ᠶ | ᠶ᠊ | ᠶ᠊ | 4 | 3 |

Fig. 2B

| no | S-alone | Term. | Medial | Initial | Shapes | Class |
|----|---------|-------|--------|---------|--------|-------|
| 21 | ص | ص | ص | ص | 4 | 3 |
| 22 | ض | ض | ض | ض | 4 | 3 |
| 23 | ط | ط | ط | ط | 4 | 3 |
| 24 | ظ | ظ | ظ | ظ | 4 | 3 |
| 25 | ع | ع | ع | ع | 4 | 3 |
| 26 | غ | غ | غ | غ | 4 | 3 |
| 27 | ف | ف | ف | ف | 4 | 3 |
| 28 | ق | ق | ق | ق | 4 | 3 |
| 29 | ك | ك | ك | ك | 4 | 3 |
| 30 | ل | ل | ل | ل | 4 | 3 |

Fig. 2C

| no | S-alone | Term. | Medial | Initial | Shapes | Class |
|---|---|---|---|---|---|---|
| 31 | ر | ر | ﺮ | ﺭ | 4 | 3 |
| 32 | ز | ز | ﺰ | ﺯ | 4 | 3 |
| 33 | و | و | ﻮ | ﻭ | 4 | 3 |
| 34 | ي | ي | ﻳ | ﻱ | 2 | 2 |
| 35 | ي | ي | ﻳ | ﻱ | 2 | 2 |
| 36 | ي | ي | ﻳ | ﻱ | 2 | 2 |
| 37 | ي | ي | ﻳ | ﻱ | 2 | 2 |
| 38 | ي | ي | ﻳ | ﻱ | 2 | 2 |
| 39 | ى | ى | ﻰ | ﻯ | 2 | 2 |
| 40 | ى | ى | ﻰ | ﻯ | 4 | 3 |

Fig. 2D

ADAPTIVE SLIDING WINDOWS FOR TEXT RECOGNITION

BACKGROUND

Digitizing documents into an electronic form for easy storage, retrieval, searching, and indexing is of major importance in the digital age. Highly reliable and robust document analysis and processing systems are needed to convert a huge amount of information from paper form to digital form.

A text recognition system is a core component to converting documents to a digital form. Text recognition systems are generally trained and used for handwritten and printed text. Major challenges related to text recognition exist for degraded documents, recognition of irregular and unaligned text, and recognition in polyfont text. In addition, major variances exist between the different alphabets and the different scripts. Therefore, a text recognition system may work successfully for one alphabet or script, but not for another alphabet or script with different characteristics.

Research in optical character recognition started as early as the 1940s with commercial Optical Character Recognition (OCR) machines appearing in the 1950s [J. Mantas, "An overview of character recognition methodologies," *Pattern Recognit.*, vol. 19, no. 6, pp. 425-430, January 1986—incorporated herein by reference in its entirety]. The earlier systems were restricted in terms of the operating conditions and the document layout, as well as the fonts which could be recognized. The current state-of-the-art allows for flexible operating conditions and the ability to deal with complex document layouts and varied fonts (e.g. [I. Marosi, "Industrial OCR approaches: architecture, algorithms, and adaptation techniques," *Proc. SPIE*, vol. 6500. pp. 650002-650010, 2007; Y.-Y. Chiang and C. A. Knoblock, "Recognition of Multi-oriented, Multi-sized, and Curved Text," in 2011 *International Conference on Document Analysis and Recognition*, 2011, pp. 1399-1403—incorporated herein by reference in their entireties]).

One of the earliest researches on Arabic OCR was in the 1970s [B. Al-Badr and S. A. Mahmoud, "Survey and bibliography of Arabic optical text recognition," *Signal Processing*, vol. 41, no. 1, pp. 49-77, 1995—incorporated herein by reference in its entirety]. Interest in the research on Arabic text recognition and related applications has increased appreciably in the last decade. This is clear from the number of publications that resulted from this research. The description herein will be limited to related work using HMMs. HMMs are one of the most popular and state-of-the-art techniques used for text recognition and the Arabic script is cursive. HMMs are mainly used for Arabic text recognition to avoid the need of explicit segmentation of images beyond text lines. A broader perspective on text recognition can be found at [B. Al-Badr and S. A. Mahmoud, "Survey and bibliography of Arabic optical text recognition," *Signal Processing*, vol. 41, no. 1, pp. 49-77, 1995; J. Mantas, "An overview of character recognition methodologies," *Pattern Recognit.*, vol. 19, no. 6, pp. 425-430, January 1986; V. Märgner and H. El Abed, Eds., *Guide to OCR for Arabic Scripts*. London: Springer London, 2012; S. Impedovo, L. Ottaviano, and S. Occhinegro, "Optical Character Recognition—A Survey," *Int. J. Pattern Recognit. Artif. Intell.*, vol. 05, no. 01n02, pp. 1-24, June 1991; Q. Tian, P. Zhang, T. Alexander, and Y. Kim, "Survey: Omnifont printed character recognition," *Vis. Commun. Image Process Image Process*, pp. 260-268, 1991; J. Trenkle, A. Gillies, E. Erlandson, S. Schlosser, and S. Cavin, "Advances in Arabic text recognition," in *Proc. Symp. Document Image Understanding Technology*, 2001; M. S. Khorsheed, "Off-line Arabic character recognition—a review," *Pattern Anal. Appl.*, vol. 5, no. 1, pp. 31-45, 2002; N. Arica and F. T. Yarman-Vural, "An overview of character recognition focused on off-line handwriting," *IEEE Trans. Syst. Man Cybern. Part C (Applications Rev.*, vol. 31, no. 2, pp. 216-233, May 2001; A. Amin, "Off-line Arabic character recognition: the state of the art," *Pattern Recognit.*, vol. 31, no. 5, pp. 517-530, March 1998—incorporated herein by reference in their entireties].

Bazzi et al. [I. Bazzi, R. Schwartz, and J. Makhoul, "An omnifont open-vocabulary OCR system for English and Arabic," *IEEE Trans. Pattern Anal. Mach. Intell.*, vol. 21, no. 6, pp. 495-504, June 1999—incorporated herein by reference in its entirety] presented work on omnifont text recognition for English and Arabic. The text recognition system was adapted from their HMM-based speech recognition system. Bakis topology was used with the same number of states for all of the models. Each Arabic character shape was modeled with a separate HMM. Additionally, six more models were added for six common ligatures appearing in printed Arabic text. A careful distribution of training data was proposed based on different styles (e.g. bold, italics) so that the recognizer would not be biased towards the dominant style of the training data. The results for polyfont recognition were below the average result for monofont recognition, which is expected. No special treatment for polyfont text recognition was proposed, apart from training the recognizer on text images from multiple fonts so that the model could generalize to a certain degree.

Khorsheed presented a discrete HMM-based system for printed Arabic text recognition [M. S. Khorsheed, "Offline recognition of omnifont Arabic text using the HMM ToolKit (HTK)," *Pattern Recognit. Lett.*, vol. 28, no. 12, pp. 1563-1571, September 2007—incorporated herein by reference in its entirety]. The sliding window was divided into a number of cells vertically. Pixel density features were calculated from each cell of a sliding window and concatenated as a feature vector. These features were later discretized. Most of the characteristics of the system are similar to [I. Bazzi, R. Schwartz, and J. Makhoul, "An omnifont open-vocabulary OCR system for English and Arabic," *IEEE Trans. Pattern Anal. Mach. Intell.*, vol. 21, no. 6, pp. 495-504, June 1999—incorporated herein by reference in its entirety], apart from the fact that the system was based on discrete HMMs. Experiments were conducted on a database of six different fonts. Again, no special treatment was proposed for polyfont text recognition.

Natarajan et al. [P. Natrajan, Z. Lu, R. Schwartz, I. Bazzi, and J. Makhoul, "Multilingual Machine Printed OCR," *Int. J. Pattern Recognit. Artif. Intell.*, vol. 15, no. 01, pp. 43-63, February 2001—incorporated herein by reference in its entirety] presented a HMM-based OCR system for multiple scripts. Most of the system components were adapted from the speech recognition system with the distinction of feature extraction. Pixel percentile features were presented as a novelty. The features were, to a large extent, robust to image noise. Pixels accumulated from top to bottom of a sliding window frame. Image height at a certain pixel percentile was taken as a feature. Values at twenty equally-separated pixel percentiles (from 0 to 100) were appended to form a feature vector. Horizontal and vertical derivatives of the features were also appended to the feature vector. In addition, angle and correlation features were computed from ten cells of a window frame (a window frame was divided into ten overlapping cells from top to bottom). The effectiveness of the features and the overall OCR system were demonstrated by recognizing text from three different scripts—English, Arabic, and Chinese. Unsupervised HMM adaptation was used for text recognition of documents with fax-related degradation.

Prasad et al. [R. Prasad, S. Saleem, M. Kamali, R. Meermeier, and P. Natarajan, "Improvements in hidden Markov model based Arabic OCR," in 2008 *19th International Conference on Pattern Recognition*, 2008, pp. 1-4—incorporated herein by reference in its entirety] presented some improvements to the Arabic OCR system of the BBN group. The use of Parts of Arabic Word (PAW) language models were presented, which showed better performance in terms of recognition rates over word or character language models. Position-dependent HMM models, where every character shape of Arabic is treated as a separate HMM, were compared with position-independent models where each Arabic character had only one model. In addition, contextual tri-character HMMs were also tested. Results showed using a position-dependent HMM modeling strategy gives better results as compared to position-independent HMMs. However, contextual modeling along with position-dependent HMMs did not lead to improvements and actually lowered the recognition rates. Contextual HMMs for the position-independent approach does improve the results when compared to a simple position-independent modeling approach, which can be expected. Thus, it appears the use of position-independent HMMs may be enough to capture the contextual variations in printed Arabic text recognition. The work did not report any special strategy to deal with text recognition in multiple fonts.

Al-Muhtaseb et al. proposed a hierarchical sliding window for printed Arabic text recognition [H. A. Al-Muhtaseb, S. A. Mahmoud, and R. S. Qahwaji, "Recognition of off-line printed Arabic text using Hidden Markov Models," *Signal Processing*, vol. 88, no. 12, pp. 2902-2912, 2008—incorporated herein by reference in its entirety]. A window is divided into eight non-overlapping vertical segments. Eight features (count of ink-pixels) were extracted from the eight segments. Four additional features were computed from the eight features using virtual vertical sliding windows of one-fourth the height of the writing line. Three more features were calculated using a virtual vertical overlapping sliding window of one-half the writing line height with an overlap of one-fourth the writing line height. An additional feature was computed by summing the first eight features. These hierarchical windows resulted in features that had more weight in the center region of the writing line (baseline). These hierarchical windows resulted in very high recognition rates on synthesized data [H. A. Al-Muhtaseb, S. A. Mahmoud, and R. S. Qahwaji, "Recognition of off-line printed Arabic text using Hidden Markov Models," *Signal Processing*, vol. 88, no. 12, pp. 2902-2912, 2008—incorporated herein by reference in its entirety]. Experiments on text line images extracted from scanned documents showed poor results [I. Ahmed, S. A. Mahmoud, and M. T. Parvez, "Printed Arabic Text Recognition," in *Guide to OCR for Arabic Scripts*, V. Märgner and H. El Abed, Eds. Springer London, 2012, pp. 147-168—incorporated herein by reference in its entirety].

Slimane et al. [F. Slimane, O. Zayene, S. Kanoun, A. Alimi, J. Hennebert, and R. Ingold, "New features for complex Arabic fonts in cascading recognition system," in *Proc. of* 21*st International Conference on Pattern Recognition*, 2012, pp. 738-741—incorporated herein by reference in its entirety] proposed some font specific features for complex Arabic fonts like DecoType Thuluth, DecoType Naskh, and Diwani Letters. These fonts are difficult due to their complex appearances and ligatures. A large number of features and some of the features common to all the fonts were proposed, while some other features are specific for each font. HMMs were used as the recognition engine. Good improvements were reported over the baseline system for all three fonts. The system was evaluated on an APTI database of printed Arabic text on multiple fonts with low resolution and different degradation condition [F. Slimane, R. Ingold, S. Kanoun, A. M. Alimi, and J. Hennebert, "A New Arabic Printed Text Image Database and Evaluation Protocols," in 10*th International Conference on Document Analysis and Recognition*, 2009, pp. 946-950—incorporated herein by reference in its entirety]. The database was generated synthetically.

Ait-Mohand et al. [K. Ait-Mohand, T. Paquet, and N. Ragot, "Combining structure and parameter adaptation of HMMs for printed text recognition," *IEEE Trans. Pattern Anal. Mach. Intell.*, 2014—incorporated herein by reference in its entirety] presented a work on polyfont text recognition using HMMs. The main contribution of the work was related to HMM model length adaptation techniques integrated with HMM data adaptation techniques, such as MLLR and MAP. The proposed techniques were effective in polyfont text recognition tasks, and significant improvements were reported by using this technique over the traditionally used HMM adaptation, which only addresses the data part of HMM. The two main limitations of the work, as pointed out by the authors are the need for a small amount of labeled data for the test font, and the assumption that the test line images will be from only a single font.

SUMMARY

In one embodiment, a text-recognition system includes a trained classifier configured with circuitry to identify a font of a frame of text line image. The system also includes an adaptive sliding window configured with circuitry to divide the frame into a plurality of cells. A first cell is located around a prominent writing line of the text line image. Additional cells are located above the prominent writing line and below the prominent writing line, such that each of the additional cells above the prominent writing line has a same percentage of ink-pixels and each of the additional cells below the prominent writing line has a same percentage of ink-pixels. The system also includes a font-specific feature parameters database configured with circuitry for extraction of text features from each of the cells. The system also includes one or more trained font-specific recognizers configured with circuitry to recognize the extracted text features using an associated font-specific recognizer for the identified font.

In another embodiment, a method of recognizing text includes receiving a frame of text line image, and identifying a font of the text line image via a trained classifier for font association. The method also includes dividing the frame into a plurality of cells via an adaptive sliding window. A width of each of the cells is determined when a ratio of a sum of ink-pixels within the respective cell to a total number of ink-pixels is greater than or equal to an inverse of a total number of cells in the frame. The method also includes extracting text features with associated font-specific parameters from each of the cells, and recognizing the extracted text features using an associated font-specific recognizer for the identified font. The method also includes outputting a recognition hypothesis.

In another embodiment, a text recognition system includes circuitry configured to identify a font of a received frame of text line image from a trained classifier for font association. The circuitry is also configured to divide the received frame into a plurality of cells. A first cell is located around a prominent writing line of the text line image. One or more additional cells are located above the first cell and one or more additional cells are located below the first cell. The circuitry is also configured to extract text features from each of the cells using feature parameters specific to the identified font. The circuitry is also configured to recognize the extracted text features using a monofont recognizer specific to the identified font.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

Figure 1A:
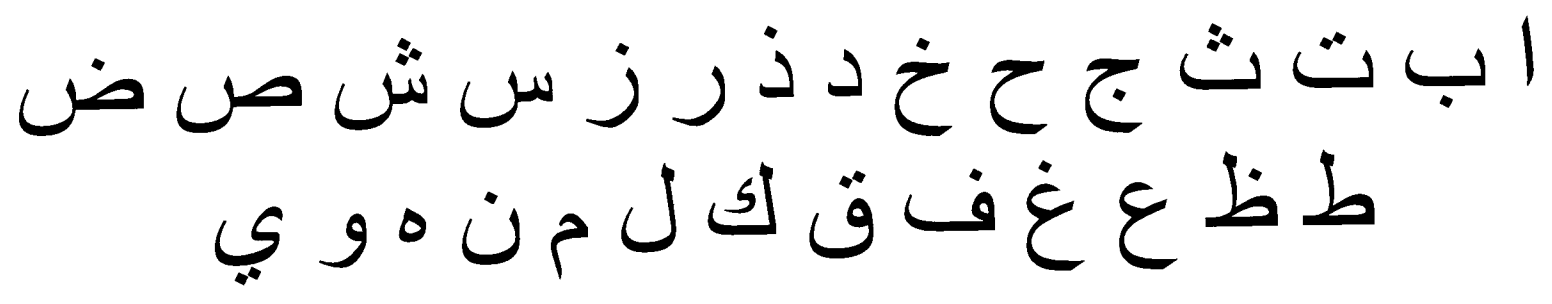

FIG. 1A illustrates the Arabic alphabet according to an embodiment;

FIG. 2A is a table of characters and forms of the Arabic alphabet number 1-10 according to an embodiment;

FIG. 2B is a table of characters and forms of the Arabic alphabet number 11-20 according to an embodiment;

FIG. 2C is a table of characters and forms of the Arabic alphabet number 21-30 according to an embodiment;

FIG. 2D is a table of characters and forms of the Arabic alphabet number 31-40 according to an embodiment;

DETAILED DESCRIPTION OF THE EMBODIMENTS

Figure 1B:
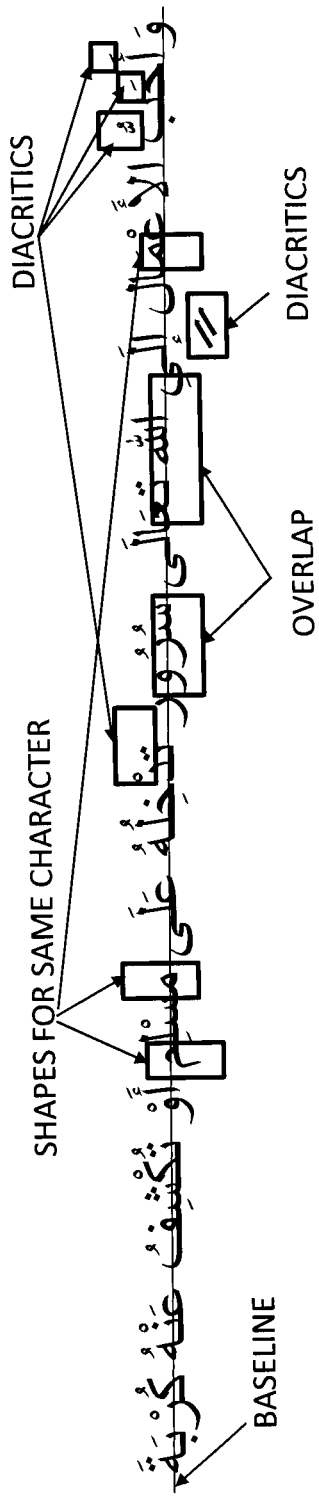
FIG. 1B illustrates a subset of Arabic text characteristics according to an embodiment.

In the digital age it is a goal to achieve seamless interaction between the physical and the digital world. Digitizing documents into electronic form that can be easily stored, retrieved, searched, and indexed is of prime importance. Moreover, due to widespread use of paper and the fact that a huge amount of information is already available in paper form, there is a need to convert paper form information into an electronic form [B. Al-Badr and S. A. Mahmoud, "Survey and bibliography of Arabic optical text recognition," *Signal Processing*, vol. 41, no. 1, pp. 49-77, 1995—incorporated herein by reference in its entirety]. This leads to the need of highly reliable and robust document analysis and processing systems.

The core component of a document processing system is a text recognition module. For the success of any document processing system, accuracy is a key component. Separate recognition systems are generally trained and used for handwritten and printed text recognition tasks. State-of-the-art printed text recognition systems are more mature, as compared to handwritten text recognition. However, printed text recognition still has challenges that need to be addressed. Some of the primary challenges are related to text recognition of degraded documents, recognition of irregular and unaligned text, and recognition in polyfont text. If the text to be recognized has a font substantially different than the fonts on which the recognizer was trained, the task becomes even more difficult.

Hidden Markov Models (HMM) are one of the most widely used and successful classifiers for text recognition [G. A. Fink, *Markov Models for Pattern Recognition*, 2nd ed. London: Springer London, 2014; T. Plötz and G. A. Fink, "Markov models for offline handwriting recognition: a survey," *Int. J Doc. Anal. Recognit.*, vol. 12, no. 4, pp. 269-298, October 2009—incorporated herein by reference in their entireties]. HMMs avoid the need to explicitly segment a text line image into smaller units, such as characters or strokes, which is normally the case when using other classifiers. It can seamlessly integrate and use language models during the decoding process. Moreover, it has sound theoretical and mathematical foundations and it appears to cope with noise robustly. The general trend for Arabic text recognition is to use HMMs, due mainly to the cursive nature of Arabic text (in addition to the reasons cited above). Printed Arabic text recognition shares the same challenges as those faced by other scripts, but it has its own peculiarities. Some of the peculiarities like right-to-left writing direction can be easily adapted while extending an existing recognizer designed for other scripts like Roman [I. Bazzi, R. Schwartz, and J. Makhoul, "An omnifont open-vocabulary OCR system for English and Arabic," *IEEE Trans. Pattern Anal. Mach. Intell.*, vol. 21, no. 6, pp. 495-504, June 1999; M. P. Schambach, J. Rottland, and T. Alary, "How to convert a Latin handwriting recognition system to Arabic," *Proc. ICFHR*, pp. 265-270, 2008—incorporated herein by reference in their entireties]. Other distinctive features of Arabic script open possibilities for researchers to investigate how best to cope with those features.

Arabic script is cursive both in printed and handwritten form. It has twenty-eight basic characters. Sixteen of those characters have one or more dots either above it or below it. Those dots differentiate the otherwise similar looking core shapes. Some characters can be connected to following characters in a word, but some other characters can only be connected to a word and cannot connect to the following characters in a word. The shape of an Arabic character depends on its position in the word. Some characters (those which can be connected to following characters in a word) can take up to four position-dependent shapes, whereas other characters (which cannot connect to the following character) have two position-dependent shapes. Moreover, there are optional diacritics which might be attached either above or below the characters. These diacritics are different than the mandatory dots that separate different characters having similar core shapes. Another important aspect of the script is its prominent writing line, wherein Arabic script has a sharp writing line. These properties of the script can be utilized for robust and adaptive cell division of the sliding windows used for feature extraction.

In embodiments described herein, a new approach of a sliding window technique for feature extraction is proposed. The size and position of the cells in the sliding window adapts to the text line image, depending upon the writing line of the Arabic text as well as on the ink-pixel distributions. Simple and effective features for font identification are mainly designed based on the projection profile of Arabic script. The font identification step integrates with a printed text recognition framework for polyfont text recognition and for unseen-font text recognition tasks. A two-step approach is used in which the input text line image is associated to the closest-seen font in the first step, and HMM-based text recognition is performed in the second step using the recognizer trained on the associated text of the font. This approach appears to be more effective than the commonly followed approach of recognizing the text using a recognizer trained on text samples of various different fonts. The approach described herein overcomes the common limitations of other techniques, such as the need for labeled samples of the text font to be recognized and the assumption of isogeny of data, i.e. text lines to be recognized are from only one font at a time [K. Ait-Mohand, T. Paquet, and N. Ragot, "Combining structure and parameter adaptation of HMMs for printed text recognition," *IEEE Trans. Pattern Anal. Mach. Intell.*, 2014—incorporated herein by reference in its entirety].

Using a sliding window for feature extraction from the text line images is a common approach when using HMMs for recognition [G. A. Fink, *Markov Models for Pattern Recognition,* 2nd ed. London: Springer London, 2014—incorporated herein by reference in its entirety]. It allows for sequencing of two-dimensional image data, and the need for segmentation of text line into characters or smaller units is avoided. There are different approaches to designing the sliding window for extracting features from a text line image. One of the earlier approaches for printed text recognition was presented by the BBN group [I. Bazzi, R. Schwartz, and J. Makhoul, "An omnifont open-vocabulary OCR system for English and Arabic," *IEEE Trans. Pattern Anal. Mach. Intell.*, vol. 21, no. 6, pp. 495-504, June 1999—incorporated herein by reference in its entirety]. A window frame runs along the text line image. The width of the frame is a few pixels wide and a part of it overlaps with the next frame. Each frame is vertically divided into several cells of uniform size. Simple features are extracted from each of the cells and are concatenated to form the feature vector for a sliding window frame. This design appears to be effective and has been used successfully for printed text recognition by researchers [M. S. Khorsheed, "Offline recognition of omnifont Arabic text using the HMM ToolKit (HTK)," *Pattern Recognit. Lett.*, vol. 28, no. 12, pp. 1563-1571, September 2007; U.-V. Marti and H. Bunke, "Handwritten sentence recognition," in *Proceedings 15th International Conference on Pattern Recognition. ICPR-*2000, 2000, pp. 463-466; S. Saleem, H. Cao, K. Subramanian, M. Kamali, R. Prasad, and P. Natarajan, "Improvements in BBN's HMM-based offline Arabic handwriting recognition system," in *Document Analysis and Recognition,* 2009. *ICDAR '09. 10th International Conference on,* 2009, pp. 773-777—incorporated herein by reference in their entireties]. Muhtaseb et al. H. A. Al-Muhtaseb, S. A. Mahmoud, and R. S. Qahwaji, "Recognition of off-line printed Arabic text using Hidden Markov Models," *Signal Processing*, vol. 88, no. 12, pp. 2902-2912, 2008—incorporated herein by reference in its entirety] proposed a hierarchal window scheme for printed text recognition. This approach has some similarities to the previous approach, but differs in that they not only extract features from the individual cells but they successively combine different groups of cells in a frame and extract additional features from them. There are other approaches also, where the sliding window is not subdivided into cells but the features are extracted from the complete sliding window [U.-V. Marti and H. Bunke, "Handwritten sentence recognition," in *Proceedings 15th International Conference on Pattern Recognition. ICPR-*2000, 2000, pp. 463-466—incorporated herein by reference in its entirety]. Alhajj et al. [R. Al-Hajj Mohamad, L. Likforman-Sulem, and C. Mokbel, "Combining slanted-frame classifiers for improved HMM-based Arabic handwriting recognition," *Pattern Anal. Mach. Intell. IEEE Trans.*, vol. 31, no. 7, pp. 1165-1177, 2009—incorporated herein by reference in its entirety] proposed slanting windows to be used in addition to the normal straight windows. They were mainly designed for a handwritten text recognition task to capture writing variability, due to the slant in handwritings and the overlap and the shifted positions of diacritical marks.

Figure 3A:
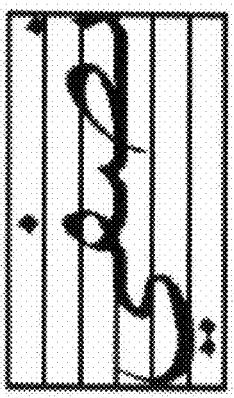
FIG. 3 illustrates three examples of an Arabic character according to an embodiment.
Figure 3B:
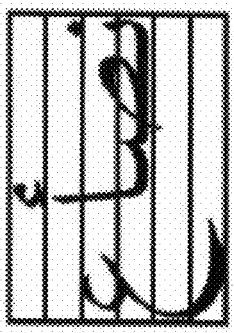
Figure 3C:

Dividing the sliding window into a number of cells as presented in [I. Bazzi, R. Schwartz, and J. Makhoul, "An omnifont open-vocabulary OCR system for English and Arabic," *IEEE Trans. Pattern Anal. Mach. Intell.*, vol. 21, no. 6, pp. 495-504, June 1999; M. S. Khorsheed, "Offline recognition of omnifont Arabic text using the HMM ToolKit (HTK)," *Pattern Recognit. Lett.*, vol. 28, no. 12, pp. 1563-1571, September 2007; H. A. Al-Muhtaseb, S. A. Mahmoud, and R. S. Qahwaji, "Recognition of off-line printed Arabic text using Hidden Markov Models," *Signal Processing*, vol. 88, no. 12, pp. 2902-2912, 2008—incorporated herein by reference in their entireties] may not be the best option for Arabic script, as was discussed in [I. Ahmed, S. A. Mahmoud, and M. T. Parvez, "Printed Arabic Text Recognition," in *Guide to OCR for Arabic Scripts*, V. Märgner and H. El Abed, Eds. Springer London, 2012, pp. 147-168—incorporated herein by reference in its entirety]. The vertical position of characters in a text line image may vary depending on the actual text and also depending on the presence or absence of optional diacritics. FIG. 3 illustrates this issue with some examples of Arabic word images. It can be seen from FIG. 3 that the same character may be positioned in different cells in different words. Similar observations can be made for other characters.

Embodiments described here include an improvement to the cell division technique in a sliding window. The peculiarities of Arabic script are used as a basis for a new cell division technique. Arabic script has a very prominent writing line. A sharp increase in pixel density can be seen, followed by a sharp decrease towards the lower half of the writing line. This property of the script can be utilized to decide the cell positions so that they are robust to variations in the writing line position with respect to the height of the image. Moreover, the size of the cells is variable such that the cells are smaller around the writing line where the pixel concentration is higher, and the cell size increases gradually farther away from the writing line (both below and above it). A cell is placed around the writing line and a number of cells are placed above and below it. The number of cells below the writing line is usually fewer than the number of cells above the writing line, as this design suits the properties of the Arabic script.

Embodiments herein describe adaptive sliding windows used in text recognition. Hidden Markov Models can be used as classifiers. A Markov Model classifies a state into a number of possibilities over a set transition period. Estimates of each transition probability are determined, wherein each transition probability is the number of transitions observed for the particular state per total number of transitions for the transition period. A Hidden Markov Model (HMM) considers factors that cannot be observed directly, but uses other indirect factors (hidden factors) to estimate a probability. HMMs avert the need to explicitly segment a text line image into smaller units, such as characters or strokes, as required by other classifiers. HMMs can integrate and use language models during the decoding process, and they are based on sound theoretical and mathematical foundations.

HMMs are used for Arabic text recognition due to the cursive nature of Arabic text. Printed Arabic text recognition shares the same challenges as other scripts, and has its own unique challenges such as a right-to-left writing direction.

The Arabic alphabet has twenty-eight basic letters, which are illustrated in FIG. 1A. An Arabic letter can have up to four basic different shapes, depending upon the position of the letter within the word. The letter can have a standalone, initial, terminal, or medial form. Letters of a word can also overlap vertically with or without touching. Different Arabic letters have different sizes in terms of height and width. Letters in a word can have short vowels (diacritics). The diacritics are written as strokes, placed either on top of or below the letters. A different diacritic on a letter can change the meaning of the word. Each diacritic has its own code as a separate letter when it is considered in a digital text. Readers of Arabic are accustomed to reading un-vocalized text by deducing the meaning from the context.

FIG. 1B illustrates a subset of Arabic text characteristics that relate to character recognition. A base line, overlapping letters, diacritics, and three shapes of the Lam character (terminal, medial, and initial) are characteristics that have been demonstrated to be related to character recognition tasks. The Arabic alphabet has twenty-eight basic characters, and sixteen of those characters have one or more mandatory dots either above it or below it to differentiate the otherwise similar looking core shapes. The mandatory dots are different from the optional diacritics illustrated in FIG. 1B.

FIGS. 2A-2D are tables illustrating the forty different characters and associated forms for the various positions of the letter within a word, i.e. standalone, terminal, medial, and initial. FIGS. 2A-2D also illustrate the number of different shapes for the same letter, and the particular class according to the number of shapes each letter can take. Class 1 includes a single shape of the Hamza, which comes in a standalone state only. Hamza does not connect with any other letter. Class 2 is a medial class in which the letters can be either a standalone or connect only from the right. Class 3 includes letters that can be connected from either side or both sides, and can also appear as a standalone.

In order to use HMMs, feature vectors are computed as a function of an independent variable. This simulates the use of HMM in speech recognition, where sliding windows can be used. Using a sliding window technique bypasses the need for segmenting Arabic text.

FIG. 3 illustrates three examples of the same character, Noon. The three characters have been divided into six equal vertically-stacked sliding window cells. In (a), the dot is in cell one, while the core of the character is primarily in cell three. In (b), the same character has its core in cell four, while the dot is in cell two. In (c), the same character has its dot in cell two, while most of the core is in cell five. It is evident that some cells have a much higher density of text than other cells, even for the same character.

Figure 4:
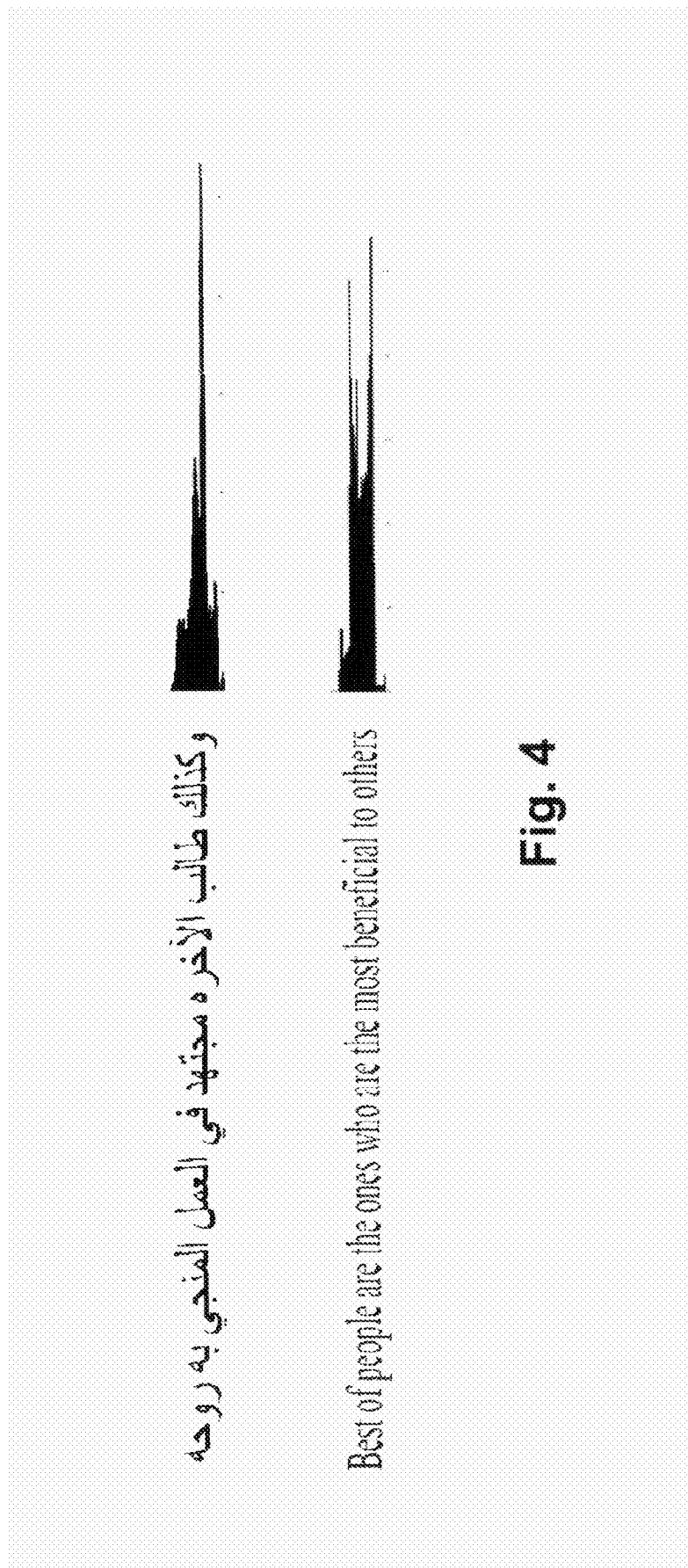
FIG. 4 illustrates two prominent writing lines according to an embodiment.

Arabic script has a sharp and prominent writing line. FIG. 4 illustrates a sentence using the Arabic script (top line) and the same sentence using the Roman script (bottom line). The Arabic script has one writing line that is very prominent, and it has a unique pattern of pixel distribution. These properties of the Arabic script can be utilized for a robust and adaptive cell division of the sliding windows used for feature extraction in embodiments described herein.

A sliding window with a variable width and height can be used, along with horizontal and vertical overlapping windows to extract Arabic text features. This approach attempts to account for the difference in text density illustrated in FIG. 3 above. Different values for the window width and height can be used. Different types of windows can be used to get more features of each vertical segment. The direction of the text line can be used as the feature extraction axis.

As illustrated in FIG. 4, a single prominent line exists for the Arabic script that is positioned slightly below the vertical midpoint. The density of the text tapers off both above and below the prominent line, with a higher density of text above the prominent line than below the prominent line. Therefore, a stack of horizontal windows can be used to divide the Arabic script vertically. Narrower windows can be used where the density of text is greatest, with wider windows being used where the text is less dense farther away from the prominent line.

Figure 5:
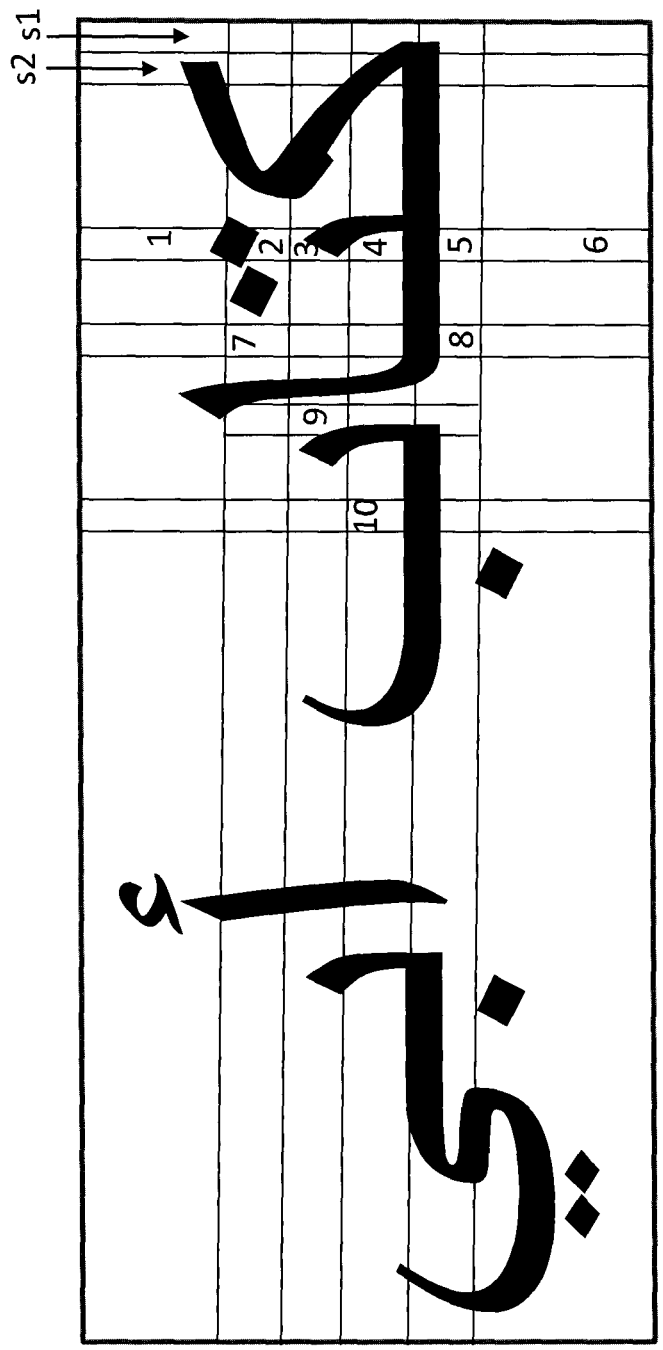
FIG. 5 illustrates vertically-stacked windows of varying size and dimensions for an Arabic character according to an embodiment.

FIG. 5 illustrates an example, given for illustrative purposes only, of six vertically-stacked windows of varying size and dimensions for a selected character. Four narrow windows can be used with one narrow window placed around the prominent line, one narrow window placed below the prominent line, and two narrow windows placed above the prominent line. Two wide windows can be used, with one wide window placed at the top of the narrow windows and one wide window placed at the bottom of the narrow windows. In addition, window overlaps can be positioned to sweep the Arabic text along the prominent line axis in a right-to-left direction. In an example, each window can overlap the previous window by one pixel to form individual cells. However, other numbers and sizes of windows can be used, as well as other overlapping window sizes. The features are extracted from each of the cells and are concatenated to form the feature vector for a sliding window frame.

The example described above for multiple-stacked windows of variable size attempts to perform text recognition on a mass scale based upon a general tendency of Arabic script patterns. However, the vertical position of characters in a text line image can vary depending upon the actual text and also depend upon the presence or absence of optional diacritics.

An exemplary algorithm for determining a total number of cells and the number of cells to be placed above the prominent writing line is given below. The user decides the total number of cells and the number of cells above the writing line. Once the cell division has been set for the sliding window, desired features can be extracted from them.

Let n=the total number of cells in a frame

Let a=the number of cells above the writing line

Place a cell, $cell_{w1}$ around the writing line such that the baseline of the text is in the middle of the cell. The width of the cell shall be such that the following is satisfied:

$$\frac{\text{(Sum of ink-pixels within the cell)}}{\text{(Total ink-pixels)}} \geq \frac{1}{\text{(Total \# of cells in a frame)}}$$

Divide the area above $cell_{w1}$ into 'a' cells, such that each cell of the 'a' cells has the same percentage of ink-pixels.

Divide the area below $cell_{w1}$ into 'n-a-1' cells, such that each cell of the 'n-a-1' cells has the same percentage of ink-pixels.

Figure 6A:
FIG. 6 illustrates adaptive sliding windows according to an embodiment.
Figure 6B:
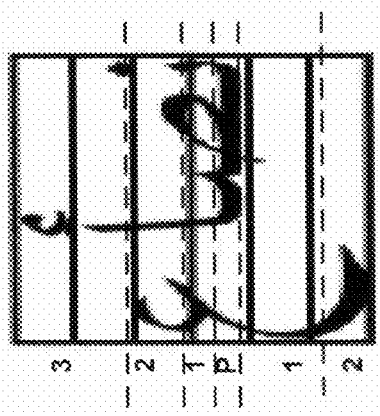
Figure 6C:
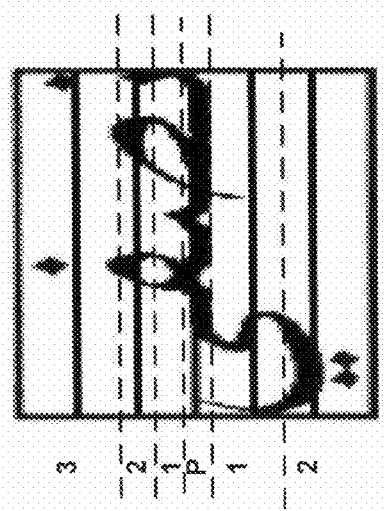

After the cell division has been established for a sliding window, the desired features can be extracted from the text of the cells. FIG. 6 illustrates adaptive sliding windows according to embodiments described herein. FIG. 6 illustrates the three examples of the same character, Noon previously illustrated in FIG. 3. In addition, dashed lines have been superimposed upon the Arabic scripts of the three examples in FIG. 6 to illustrate the locations and sizes of cells according to embodiments described herein. 'P' represents the primary writing line of the script. The first script (a) has the primary writing line 'P' at the center of the script writing sample, and the second script (b) has the primary writing line 'P' slightly below the center of the script writing sample. However, the third script (c) has the primary writing line 'P' well below the center of the script writing sample.

The locations of cells above and below the primary writing line 'P' are based upon the location of the primary writing line 'P'. The cell sizes are based upon the percentage of written pixels within the cell. As described above, the size of the cells above the primary writing line 'P' are determined such that each of the cells above the primary writing line 'P' has approximately the same percentage of written pixels within each cell. Likewise, the size of the cells below the primary writing line 'P' are determined such that each of the cells below the primary writing line 'P' has approximately the same percentage of written pixels within each cell. The percentages of written pixels within the cells of the three script writing samples illustrated in FIG. 6 were not calculated and may not be exact.

FIG. 6 also illustrates there may be different numbers of cells above and/or below the primary writing line 'P'', which is based upon an overall density of written pixels within the vicinity. In an embodiment, a more dense script may have smaller cells and a higher number of cells to maximize the text recognition. In another embodiment, such as the third script (c), more cells may be present above or below the primary writing line 'P' and/or fewer cells may be present above or below the primary writing line 'P'.

Embodiments herein describe an enhancement to the above-described multiple stacked windows of varying size, wherein the ink-pixel distribution is considered. In addition, the font of the script is identified. A two-step approach is used, wherein the input text line image is associated to the closest seen font in the first step. HMM-based text recognition is performed in the second step using the recognizer trained on the associated font of the text. The two-step approach has been shown to be more effective than recognizing the text by using a recognizer trained on text samples of various different fonts. The two-step approach also overcomes the need for labeled samples of the text font to be recognized and the assumption of isogeny of data, i.e. the text lines are recognized from only one font at a time.

In practical situations, it may be simplistic to expect to recognize text from just one font. On the contrary, it may be necessary to recognize text in several fonts, and the font order of the text line images may be random. In addition, it may be necessary to recognize text for fonts not seen during training. One approach to addressing this problem trains a recognizer with samples from as many fonts as possible to provide the recognizer with the variability during the recognition phase. However, the recognition rates are still well below the average recognition rates for monofont text recognition.

A two-step font association-based approach as described herein overcomes the above limitations to a large degree. Multiple monofont text recognizers are trained, rather than training one recognizer over multiple fonts. In addition, a font identification module associates a text line image to the closest trained font. During recognition, the input text line image will first be associated with a font. Appropriate features and classifiers can be used for training. Selected features for font identification primarily rely upon the projection profile of the text line image. These features were used with a Support Vector Machine (SVM) classifier, wherein positive results were achieved. In a second step, the monofont recognizer is trained on the associated font to generate a recognition hypothesis. This approach allows use of font-specific parameters for feature extraction, which can further optimize the recognition performance. This two-step process enables use of feature parameters that are font-specific for feature extraction.

The following features are defined for font identification of a text line image. The features were extracted from height normalized text line images. A function, p(i,j) is used to define features, wherein:

$$p(i, j) = \begin{cases} 1, & \text{if row '}i\text{' column '}j\text{' of the image has ink pixel} \\ 0, & \text{otherwise} \end{cases}$$

In the following definitions, 'h' is used for the image height, and 'w' is used to denote the image width.

A maximum ink projection ($F_1$) calculates the maximum value of the ink projection of the text image. The value is normalized by the image width. The dimension of the feature is one, wherein:

$$F_1 = \frac{\max\limits_{i:=1\,to\,h}\left(\sum_{j=1}^{w} p(i, j)\right)}{w}$$

A ratio of ink-pixels ($F_2$) is the ratio of the number of ink-pixels in a row over the maximum ink projection. The dimension of the feature is the same as the normalized height of the image, wherein:

$$F_2(i) = \frac{\sum_{j=1}^{w} p(i, j)}{\max\limits_{i:=1\,to\,h}\left(\sum_{j=1}^{w} p(i, j)\right)}$$

A percentage increase or decrease of pixel projection ($F_3$) is the percentage of increase or decrease of pixel projection in a given row as compared to the row immediately above it. The dimension of the features is one less than the normalized height of the image, wherein:

$$F_3(i) = \frac{\sum_{j=1}^{w} p(i, j) - \sum_{j=1}^{w} p(i-1, j)}{\sum_{j=1}^{w} p(i-1, j)}; \text{ where } 1 < i \le h$$

Compaction ($F_4$) is defined as the ratio of the total number of ink-pixels in a text line image over the total area of the line image. The dimension of the features is one, wherein:

$$F_4 = \frac{\sum_{i=1}^{h} \sum_{j=1}^{w} p(i, j)}{h \times w}$$

A count of projections above average ($F_5$) is the count of the number of rows in the image whose ink-pixel count is above the average ink-pixel count of the image rows. The dimension of the feature is one, wherein:

$$F_5 = \sum_{i=1}^{h} a(i); \text{ where,}$$

$$a(i) = \begin{cases} 1, & \text{if } \sum_{j=1}^{w} p(i, j) > \frac{\sum_{i=1}^{h} \sum_{j=1}^{w} p(i, j)}{h} \\ 0, & \text{otherwise} \end{cases}$$

The above-defined features are concatenated into one feature vector for a text line image.

Figure 7:
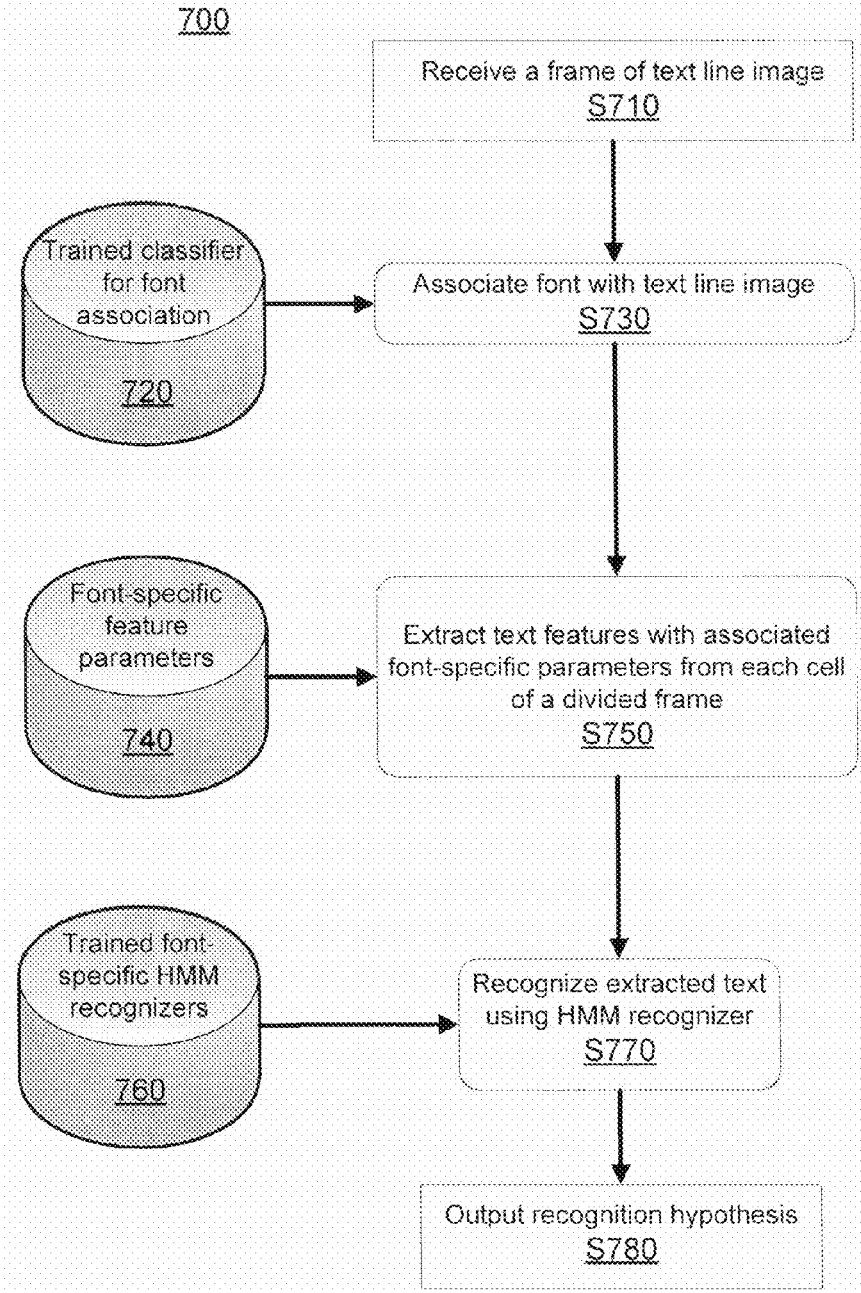
FIG. 7 is an exemplary algorithm for recognizing printed text according to an embodiment.

FIG. 7 is an exemplary algorithm 700 for recognizing printed text. A frame of a text line image is received in step S710. A classifier is trained to identify individual fonts using training samples of associated individual fonts, which are stored in database 720. Database 720 is used to associate a font with the received frame of text line image for identification of the font in step S730. Features for font identification, such as features $F_1$-$F_5$ described above are used for training a suitable classifier, such as SVM or Random Forest. The frame of text line image is associated with the closest-known font.

A font-specific feature parameter database 740 is used during extraction of text features from each cell of a divided frame in step S750. Font-specific parameters for feature extraction, such as window width and overlap, as well as other features specific to a particular font are used. The algorithm for cell division of the sliding window was previously discussed above. Trained font-specific HMM recognizers are stored in database 760. Extracted text is recognized in step S770 using database 760. A recognition hypothesis is output in step S780.

A multi-font printed Arabic text database was developed to use in conjunction with embodiments described herein for printed text recognition. In one embodiment, the database has text from eight different fonts, wherein each font is divided into three non-overlapping sets for training, validation, and testing. Three different setups were implemented to test each of the eight different fonts for monofont text recognition, polyfont text recognition, and unseen-font text recognition. However, less than eight or more than eight fonts can be used in embodiments described herein, as well as other types and numbers of setups for text recognition.

In the first setup, each of the eight different fonts has individual training, validation, and test sets, which were used for monofont recognition. A good text recognizer should have reasonable recognition rates for each of the fonts when trained and tested separately. In the second setup, the validation and test set had samples from all eight fonts. Equal numbers of samples from each font were selected and randomly sequenced in the validation and the test sets for polyfont recognition. The third setup had a test set of an unseen-font text, wherein the font was different from the eight available fonts. This setup allowed testing the robustness of the recognizer in situations where there was limited or no samples from the font whose text line images needed to be recognized.

In the monofont text recognition setup, the adaptive sliding window was used for feature extraction. The line images of the database were normalized to a fixed height to keep the aspect ratio constant. The features were extracted from the normalized text line images. Simple pixel density features from the text line image and its horizontal and vertical edge derivatives were used. The sliding window was divided into six cells, wherein three cells were above the writing line, one cell was around the writing line, and two cells were below the writing line. As a result, the dimension of feature vector was eighteen (six from the image and six each from the horizontal and vertical derivatives of the images).

The text recognition system was based on continuous density HMMs. Each character shape was treated as an individual model with a simple right to left linear topology. Some Arabic characters have four different models since they can have four position-dependent shapes. Other Arabic characters have two models since they have just two position-dependent shapes. There are also some non-Arabic characters and digits in the database that have a separate HMM model. This resulted in a total of 153 different HMMs in the recognition system. In addition, different character shapes were merged as single characters after the recognition since they essentially represented the same character. The described embodiment appeared more effective than treating each character as a class irrespective of its shape. Each character-shape HMM was modeled with the same number of states, except some narrow-width characters which were modeled with half the number of states. The optimal number of states was decided based upon the uniform initialization results on the validation set of each font.

Training was implemented in two stages. In a first stage, a uniform initialization (flat start) was implemented using the training data. In the second stage, the alignment information from the training data was used to initialize individual HMMs using Viterbi initialization followed by a number of iterations of Baum-Welch retraining. Character hypothesis was generated on the evaluation sets using Viterbi decoding.

In one embodiment, the values for the sliding window width and overlap can be adjusted for each font based on evaluation results of the validation set for each font. In another embodiment, the same values can be used for all fonts. For testing purposes, a window width of six pixels with an overlap of three pixels was used for all fonts. However, some adjustments can be made for an exceptional font. For example, Thuluth font is very compact compared to other fonts. Therefore, sliding window parameters can be adjusted accordingly. Feature extraction parameters can be optimized for each font separately if desired, which can possibly lead to improvements in recognition rates.

After sliding window parameters are selected, a two-step training of uniform initialization and alignment-based initialization can be implemented for all eight fonts. The optimal number of states per HMM can be determined upon the evaluation results on the validation set of a font. Character hypothesis on the validation set and the test set was generated. An average recognition result of 97.11% was achieved for the eight fonts. Results demonstrated the effectiveness of an adaptive sliding window technique.

In the polyfont text recognition setup, a polyfont recognizer can be trained using training samples from all fonts. The training procedure can be the same as the training procedure for the monofont text recognition setup. Optimal HMM parameters can be determined based upon results of the validation set. A final evaluation can be completed on the test set. Results were much lower for the polyfont text recognition having a recognition accuracy of 87.81% on the validation set and 87.86% on the test set was achieved, which was well below the average accuracy achieved for monofont text recognition.

To perform text recognition based on font identification, font features can be extracted from the training samples for each of the eight fonts. SVM can be used as a classifier. After associating the font of the input text image, feature extraction and recognition can be implemented on the monofont text recognizer of the associated font. This approach produced results of an overall accuracy of 96.56%, which is significantly higher than using a recognizer trained on multiple fonts.

Embodiments described herein provide an improvement for recognizing text and in particular, printed Arabic text recognition. Methods and systems of adaptively dividing a sliding window into cells utilize the writing line property of Arabic text, as well as the ink-pixel distributions. For polyfont and unseen-font text recognition, the input text line image is associated to the closest known font in a first step, and HMM-based text recognition is performed in a second step using the recognizer trained on the associated text of the font. This approach has been shown to be more effective than recognizing the text using a recognizer trained on text samples of different fonts. Font identification associates the input text to a known font. Experiments conducted using the proposed features showed high font identification results on an evaluation set containing eight commonly used Arabic fonts. The experiments and results below are intended to further illustrate the advantages of using embodiments described herein for text recognition.

A multi-font printed Arabic text database Printed-KHATT (P-KHATT) has been developed for research in the area of printed text recognition. The P-KHATT database is based on the KHATT database of unconstrained handwritten Arabic text [S. A. Mahmoud, I. Ahmad, W. G. Al-Khatib, M. Alshayeb, M. Tanvir Parvez, V. Märgner, and G. A. Fink, "KHATT: An open Arabic offline handwritten text database," Pattern Recognit., vol. 47, no. 3, pp. 1096-1112, March 2014; S. A. Mahmoud, I. Ahmad, M. Alshayeb, W. G. Al-Khatib, M. T. Parvez, G. A. Fink, V. Margner, and H. E L Abed, "KHATT: Arabic Offline Handwritten Text Database," in 2012 *International Conference on Frontiers in Handwriting Recognition (ICFHR*-2012), 2012, pp. 447-452—incorporated herein by reference in their entireties]. The database has text from eight different fonts, each divided into three non-overlapping sets (viz. training, validation, and test sets). The text and the divisions are similar to KHATT database. Table 1A below presents sample text images from the P-KHATT database in eight fonts.

TABLE 1A

Sample text line images.

| Font (Code) | Sample Text Image |
| --- | --- |
| Akhbar (AKH) | في صياغة التكنولوجيا، |
| Andalus (AND) | في صياغة التكنولوجيا، |
| Naskh (NAS) (KFGQPC Uthman Taha Naskh) | في صياغة التكنولوجيا، |
| Simplified Arabic (SIM) | في صياغة التكنولوجيا، |
| Tahoma (TAH) | في صياغة التكنولوجيا، |
| Thuluth (TLT) (DecoType Thuluth) | في صياغة التكنولوجيا، |
| Times New Roman (TNR) | في صياغة التكنولوجيا، |
| Traditional Arabic (TRA) | في صياغة التكنولوجيا، |

Text was printed and scanned at 300 DPI. Scanned pages were skew-corrected using the technique presented in [I. Ahmad, "A Technique for Skew Detection of Printed Arabic Documents," in *Computer Graphics, Imaging and Visualization (CGIV)*, 2013 10*th International Conference,* 2013, pp. 62-67—incorporated herein by reference in its entirety], and text line images were segmented from the skew-corrected page images. Table 1B presents some statistics from the P-KHATT database. In addition to the data and images for eight fonts, P-KHATT database has text line images along with its labels for a ninth font for the purpose of text recognition for unseen-font.

TABLE 1B

Some useful statistics on the P-KHATT database (per font).

| Set | No. of lines | No. of words | No. of characters (without space) | No. of characters longest line | No. of characters shortest line |
| --- | --- | --- | --- | --- | --- |
| Training | 6472 | 75216 | 358554 | 132 | 1 |
| Validation | 1414 | 16019 | 77558 | 126 | 4 |
| Testing | 1424 | 15710 | 76571 | 135 | 3 |
| All data | 9310 | 106945 | 512683 | 135 | 1 |

The details of text recognition using the adaptive sliding window are described hereunder for feature extraction. The line images of the P-KHATT database were normalized to a fixed height to keep the aspect ratio constant. The features were extracted from the normalized text line images. Simple pixel density features were used from the text line image and its horizontal and vertical edge derivatives. The sliding window was divided into six cells, such that three were above the writing line, one cell was around the writing line, and the remaining two cells were below the writing line. As a result, the dimension of the feature vector was eighteen (six from the image and six each from the horizontal and vertical derivatives of the images).

The text recognition system is based on continuous density Hidden Markov Models (HMMs). HTK tools [S. J. Young, G. Evermann, M. J. F. Gales, T. Hain, D. Kershaw, G. Moore, J. Odell, D. Ollason, D. Povey, V. Valtchev, and P. C. Woodland, *The {HTK} Book, version* 3.4. Cambridge, UK: Cambridge University Engineering Department, 2006, p. 384—incorporated herein by reference in its entirety] were used to implement the recognizer. Each character shape was treated as individual models with a simple right to left linear topology. Thus, some characters (such as Seen, Jeem) have four different models, since they can have four position-dependent shapes. However, some other characters (such as Waw, Daal) have two models, since they have only two position-dependent shapes. In addition, there are some non-Arabic characters and digits in the database, which have a separate HMM model. This leads to a total of 153 different HMMs in the recognition system. It should be noted that different character shapes are merged as a single character after the recognition, since they essentially represent the same character. This technique was more effective than treating each character as a class, irrespective of its shape. Each character-shape HMM was modeled with the same number of states, except some narrow-width characters (like Alif) which were modeled with half the number of states. The optimal number of states was decided based upon the uniform initialization (flat start) results on the validation set of each font.

Two thousand text line images were used for training, instead of using a complete training set for each font. Training was completed in two stages. In the first stage, a uniform initialization (flat start) was executed using the training data. In the next stage, the alignment information from the training data was used to initialize individual HMMs using Viterbi initialization, followed by a number of iterations of Baum-Welch retraining. A character hypothesis was subsequently generated on the evaluation sets using Viterbi decoding.

The values for the sliding window width and overlap could have been adjusted for each font, optimally based on evaluation results on the validation set of each font. However, the same values for all the fonts were used (except for Thuluth font which will be discussed later). The optimal values for the sliding window width and overlap were decided based on the evaluation results on the validation set of 'Times New Roman' font. Table 2 below presents the evaluation results on the validation set of 'Times New Roman' font for different sliding window widths and overlaps.

TABLE 2

Deciding sliding window's width and overlap based on evaluation conducted on validation set of font 'Times New Roman'

| Window (W\|O)* | No. of states | Accuracy |
| --- | --- | --- |
| 4\|2 | 10 | 98.57 |
| 2\|0 | 11 | 98.22 |
| 3\|1 | 10 | 97.46 |
| 1\|0 | 17 | 97.40 |
| 3\|0 | 7 | 98.35 |
| 4\|1 | 7 | 98.63 |
| 5\|2 | 7 | 98.74 |
| 6\|3 | 7 | 98.77 |
| 4\|0 | 6 | 97.68 |
| 6\|2 | 6 | 98.13 |
| 8\|4 | 5 | 98.44 |

*W: Width; O: Overlap

Based on the results, a window width of six pixels was used with an overlap of three pixels for all the other fonts. The recognition results for the Thuluth font were much below the average. A possible explanation could have been due to the text being very compact in Thuluth font, as compared to other fonts. As a result, it was decided to adjust the sliding window parameters for this font separately, based on the evaluation results (character recognition rates) on its validation set. Feature extraction parameters may be optimized for each font separately if desired, which may possibly lead to improvements in recognition rates. However, this approach would entail a large time and resource budget to optimally configure parameters for each font individually.

Once the sliding window parameters have been selected, the two-step training (i.e. uniform initialization followed by alignment based initialization) can be implemented for all eight fonts. The optimal number of states per HMM can be based on the evaluation results of the validation set of a font. A character hypothesis on the validation set, as well as the test set can be generated. Table 3 below presents the recognition accuracy for each of the eight fonts.

TABLE 3

Results for monofont text recognition experiments.

| Font | Window (W\|O) | No. of States | Recognition accuracy Validation | Testing | Statistical Signifi- cance |
| --- | --- | --- | --- | --- | --- |
| Times New Roman | 6\|3 | 7 | 98.77 | 98.80 | ±0.06 |
| Andalus | 6\|3 | 8 | 98.80 | 98.65 | ±0.07 |
| DecoTypeThuluth | 4\|2 | 7 | 92.49 | 92.45 | ±0.15 |
| Tahoma | 6\|3 | 9 | 99.00 | 98.96 | ±0.06 |
| Traditional Arabic | 6\|3 | 6 | 95.25 | 95.65 | ±0.12 |
| Naskh | 6\|3 | 6 | 97.39 | 96.94 | ±0.10 |
| Akbaar | 6\|3 | 6 | 97.20 | 97.13 | ±0.09 |
| Simplified Arabic | 6\|3 | 7 | 97.98 | 98.33 | ±0.07 |
| Average | | | 97.11 | 97.11 | |

The best character recognition results of 98.96% were achieved for Tahoma font. The worst recognition results of 92.45% were achieved for the Thuluth font. These results can be attributed to the Tahoma being a simple font with wide-spaced characters, whereas Thuluth is a complex font with narrow character widths and many ligatures. The average recognition results of 97.11% were achieved for the eight fonts. These results demonstrate the effectiveness of the adaptive sliding window technique described herein, considering the simple pixel density features with only six cells in a sliding window frame were used. It is difficult to compare these results with the results of other works, since each of them uses separate databases for the evaluations.

The embodiments and associated programming described herein for text recognition are used in conjunction with electronic devices and computerized systems described below. The resulting circuitry, programming, and hardware are incorporated into a special purpose computing device by which the functions, algorithms, and modules are executed and the advantages of embodiments described herein are achieved.

Figure 8:
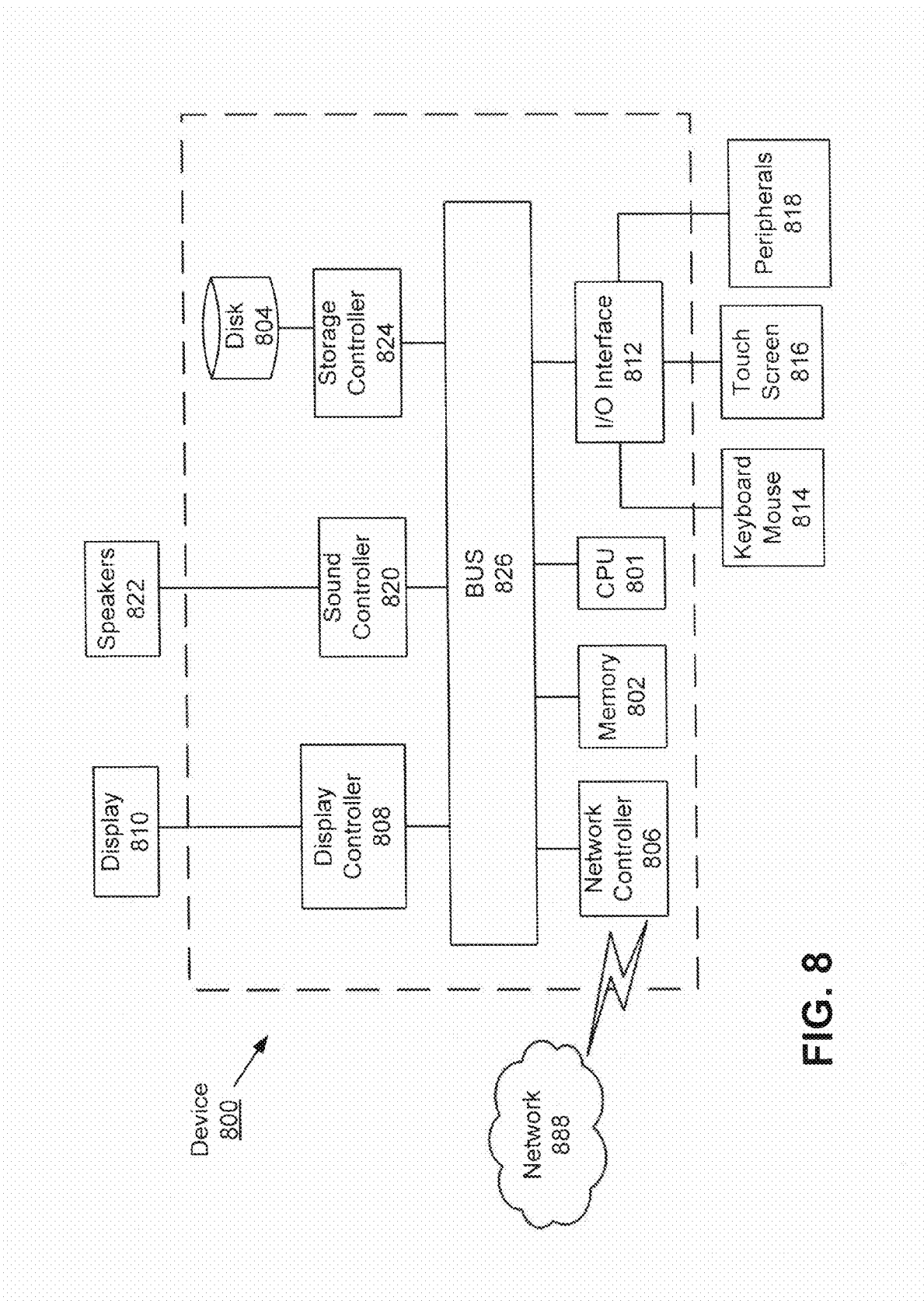
FIG. 8 is a block diagram illustrating a hardware description of a computing device according to an embodiment.

A hardware description of a computing device 800 according to exemplary embodiments is described with reference to FIG. 8. In FIG. 8, the computing device 800 includes a CPU 801 which performs the processes described above and herein after. The process data and instructions can be stored in memory 802. These processes and instructions can also be stored on a storage medium disk 804 such as a hard drive (HDD) or portable storage medium or can be stored remotely. Further, the claimed features are not limited by the form of the computer-readable media on which the instructions of the process are stored. For example, the instructions can be stored on CDs, DVDs, in FLASH memory, RAM, ROM, PROM, EPROM, EEPROM, hard disk or any other information processing device with which the computing device 800 communicates, such as a server or computer.

Further, the claimed features can be provided as a utility application, background daemon, or component of an operating system, or combination thereof, executing in conjunction with CPU 801 and an operating system such as Microsoft Windows 7, UNIX, Solaris, LINUX, Apple MAC-OS and other systems known to those skilled in the art.

The hardware elements in order to achieve the computing device 800 can be realized by various circuitry elements, known to those skilled in the art. For example, CPU 801 can be a Xenon or Core processor from Intel of America or an Opteron processor from AMD of America, or can be other processor types that would be recognized by one of ordinary skill in the art. Alternatively, the CPU 801 can be implemented on an FPGA, ASIC, PLD or using discrete logic circuits, as one of ordinary skill in the art would recognize. Further, CPU 801 can be implemented as multiple processors cooperatively working in parallel to perform the instructions of the inventive processes described above and below.

The computing device 800 in FIG. 8 also includes a network controller 806, such as an Intel Ethernet PRO network interface card from Intel Corporation of America, for interfacing with network 888. As can be appreciated, the network 888 can be a public network, such as the Internet, or a private network such as an LAN or WAN network, or any combination thereof and can also include PSTN or ISDN sub-networks. The network 888 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device 800 further includes a display controller 808, such as a NVIDIA GeForce GTX or Quadro graphics adaptor from NVIDIA Corporation of America for interfacing with display 810, such as a Hewlett Packard HPL2445w LCD monitor. A general purpose I/O interface 812 interfaces with a keyboard and/or mouse 814 as well as a touch screen panel 816 on or separate from display 810. General purpose I/O interface 812 also connects to a variety of peripherals 818 including printers and scanners, such as an OfficeJet or DeskJet from Hewlett Packard.

A sound controller 820 is also provided in the computing device 800, such as Sound Blaster X-Fi Titanium from Creative, to interface with speakers/microphone 822 thereby providing sounds and/or music.

The general purpose storage controller 824 connects the storage medium disk 804 with communication bus 826, which can be an ISA, EISA, VESA, PCI, or similar, for interconnecting all of the components of the computing device 800. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

The exemplary circuit elements described in the context of the present disclosure can be replaced with other elements and structured differently than the examples provided herein. Moreover, circuitry configured to perform features described herein can be implemented in multiple circuit units (e.g., chips), or the features can be combined in circuitry on a single chipset, as shown on FIG. 9. The chipset of FIG. 9 can be implemented in conjunction with computing device 800 described above with reference to FIG. 8.

Figure 9:
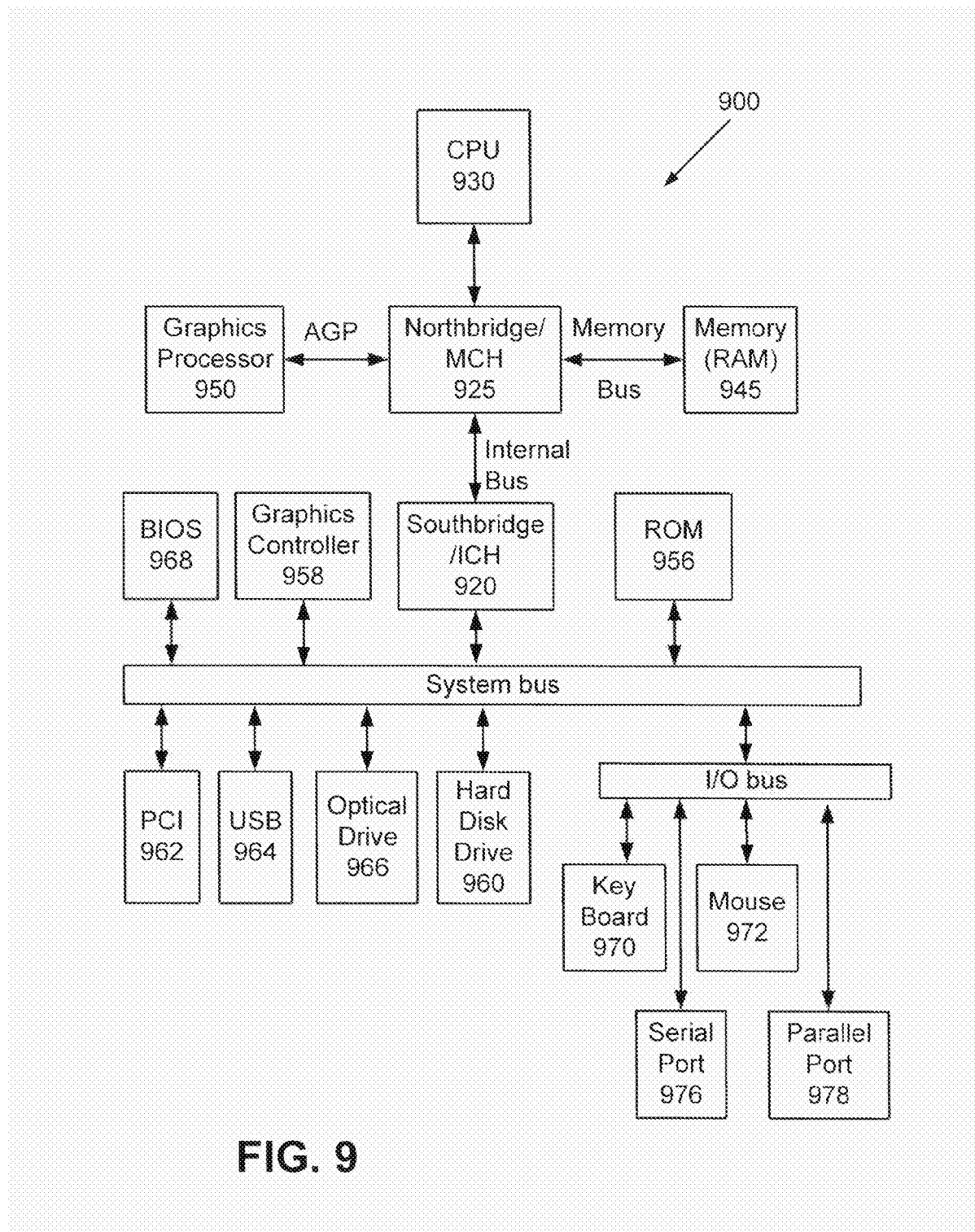
FIG. 9 is a block diagram illustrating a data processing system according to an embodiment.

FIG. 9 shows a schematic diagram of a data processing system, according to certain embodiments for performing text recognition, as described above. The data processing system is an example of a computer in which code or instructions implementing the processes of the illustrative embodiments can be located.

In FIG. 9, data processing system 900 employs a application architecture including a north bridge and memory controller application (NB/MCH) 925 and a south bridge and input/output (I/O) controller application (SB/ICH) 920. The central processing unit (CPU) 930 is connected to NB/MCH 925. The NB/MCH 925 also connects to the memory 945 via a memory bus, and connects to the graphics processor 950 via an accelerated graphics port (AGP). The NB/MCH 925 also connects to the SB/ICH 920 via an internal bus (e.g., a unified media interface or a direct media interface). The CPU 930 can contain one or more processors and even can be implemented using one or more heterogeneous processor systems.

Figure 10:
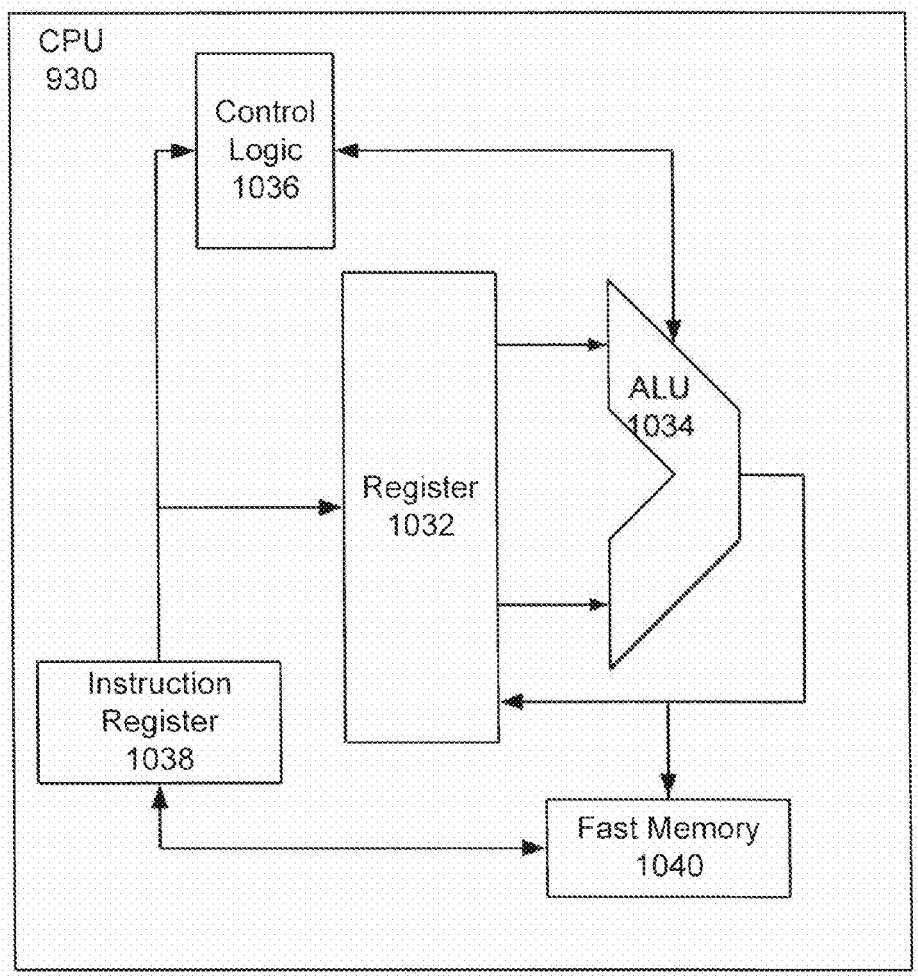
FIG. 10 is a block diagram illustrating a central processing unit according to an embodiment.

For example, FIG. 10 shows one implementation of CPU 930. In one implementation, an instruction register 1038 retrieves instructions from a fast memory 1040. At least part of these instructions are fetched from an instruction register 1038 by a control logic 1036 and interpreted according to the instruction set architecture of the CPU 930. Part of the instructions can also be directed to a register 1032. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using an arithmetic logic unit (ALU) 1034 that loads values from the register 1032 and performs logical and mathematical operations on the loaded values according to the instructions. The results from these operations can be fed back into the register 1032 and/or stored in a fast memory 1040. According to certain implementations, the instruction set architecture of the CPU 930 can use a reduced instruction set architecture, a complex instruction set architecture, a vector processor architecture, or a very large instruction word architecture. Furthermore, the CPU 930 can be based on the Von Neuman model or the Harvard model. The CPU 930 can be a digital signal processor, an FPGA, an ASIC, a PLA, a PLD, or a CPLD. Further, the CPU 930 can be an x86 processor by Intel or by AMD; an ARM processor; a Power architecture processor by, e.g., IBM; a SPARC architecture processor by Sun Microsystems or by Oracle; or other known CPU architectures.

Referring again to FIG. 9, the data processing system 900 can include the SB/ICH 920 being coupled through a system bus to an I/O Bus, a read only memory (ROM) 956, universal serial bus (USB) port 964, a flash binary input/output system (BIOS) 968, and a graphics controller 958. PCI/PCIe devices can also be coupled to SB/ICH 920 through a PCI bus 962.

The PCI devices can include, for example, Ethernet adapters, add-in cards, and PC cards for notebook computers. The Hard disk drive 960 and CD-ROM 966 can use, for example, an integrated drive electronics (IDE) or serial advanced technology attachment (SATA) interface. In one implementation the I/O bus can include a super I/O (SIO) device.

Further, the hard disk drive (HDD) 960 and optical drive 966 can also be coupled to the SB/ICH 920 through a system bus. In one implementation, a keyboard 970, a mouse 972, a parallel port 978, and a serial port 976 can be connected to the system bus through the I/O bus. Other peripherals and devices can be connected to the SB/ICH 920 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. For example, distributed performance of the processing functions can be realized using grid computing or cloud computing. Many modalities of remote and distributed computing can be referred to under the umbrella of cloud computing, including: software as a service, platform as a service, data as a service, and infrastructure as a service. Cloud computing generally refers to processing performed at centralized locations and accessible to multiple users who interact with the centralized processing locations through individual terminals.

Figure 11:
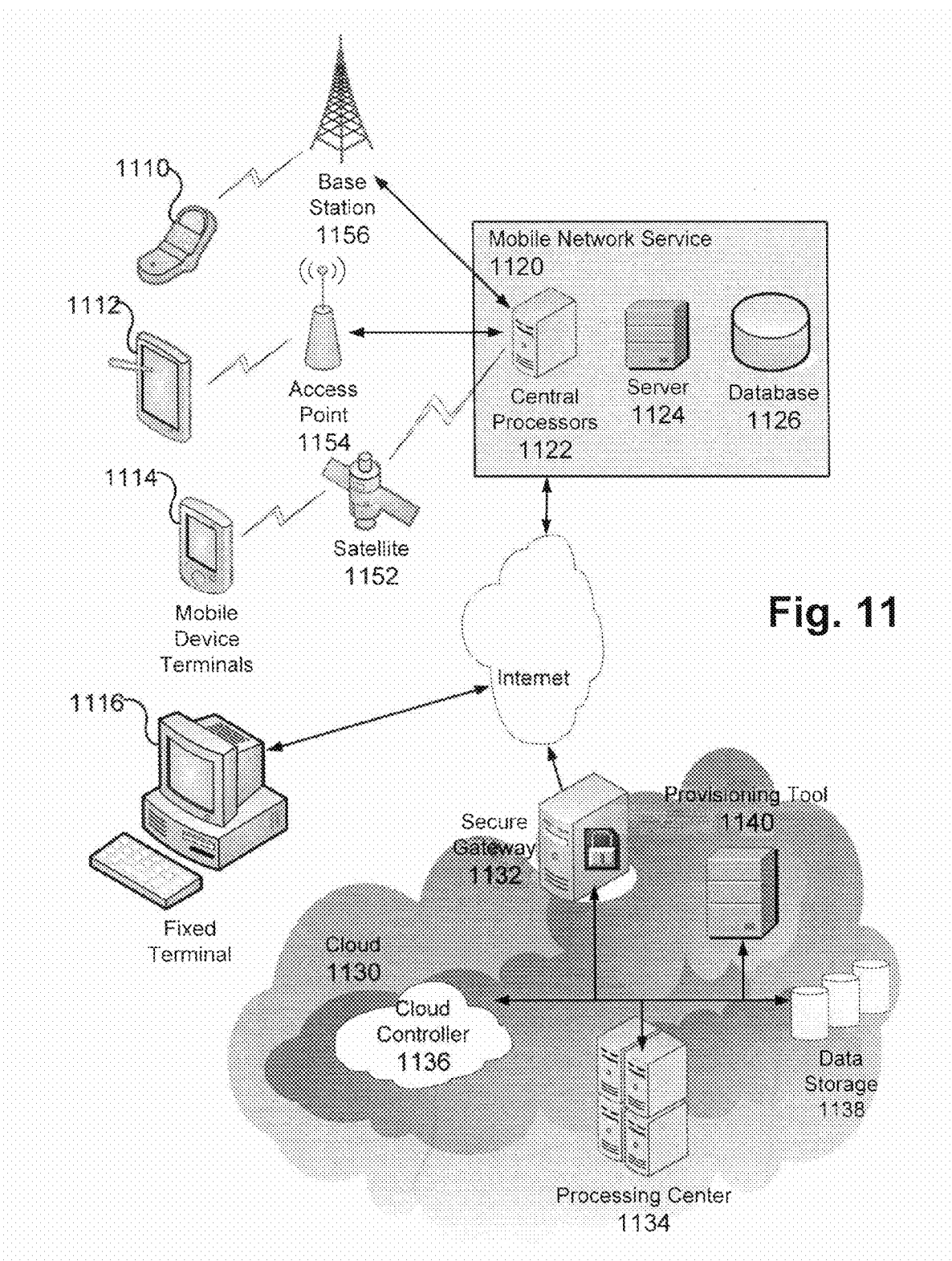
FIG. 11 illustrates a cloud computing system according to an embodiment.

FIG. 11 illustrates an example of a cloud computing system, wherein users access the cloud through mobile device terminals or fixed terminals that are connected to the Internet. Mobile device terminals can include a cell phone 1110, a tablet computer 1112, and a smartphone 1114, for example. The mobile device terminals can connect to a mobile network service 1120 through a wireless channel such as a base station 1156 (e.g., an Edge, 3G, 4G, or LTE Network), an access point 1154 (e.g., a femto cell or WiFi network), or a satellite connection 1152. In one implementation, signals from the wireless interface to the mobile device terminals (e.g., the base station 1156, the access point 1154, and the satellite connection 1152) are transmitted to a mobile network service 1120, such as an EnodeB and radio network controller, UMTS, or HSDPA/HSUPA. Mobile users' requests and information are transmitted to central processors 1122 that are connected to servers 1124 to provide mobile network services, for example. Further, mobile network operators can provide service to mobile users for authentication, authorization, and accounting based on home agent and subscribers' data stored in databases 1126, for example. The subscribers' requests are subsequently delivered to a cloud 1130 through the Internet.

A user can also access the cloud through a fixed terminal 1116, such as a desktop or laptop computer or workstation that is connected to the Internet via a wired network connection or a wireless network connection. The mobile network service 1120 can be a public or a private network such as an LAN or WAN network. The mobile network service 1120 can be wireless such as a cellular network including EDGE, 3G and 4G wireless cellular systems. The wireless mobile network service 1120 can also be Wi-Fi, Bluetooth, or any other wireless form of communication that is known.

The user's terminal, such as a mobile user terminal and a fixed user terminal, provides a mechanism to connect via the Internet to the cloud 1130 and to receive output from the cloud 1130, which is communicated and displayed at the user's terminal. In the cloud 1130, a cloud controller 1136 processes the request to provide users with the corresponding cloud services. These services are provided using the concepts of utility computing, virtualization, and service-oriented architecture.

In one implementation, the cloud 1130 is accessed via a user interface such as a secure gateway 1132. The secure gateway 1132 can for example, provide security policy enforcement points placed between cloud service consumers and cloud service providers to interject enterprise security policies as the cloud-based resources are accessed. Further, the secure gateway 1132 can consolidate multiple types of security policy enforcement, including for example, authentication, single sign-on, authorization, security token mapping, encryption, tokenization, logging, alerting, and API control. The cloud 1130 can provide to users, computational resources using a system of virtualization, wherein processing and memory requirements can be dynamically allocated and dispersed among a combination of processors and memories to create a virtual machine that is more efficient at utilizing available resources. Virtualization creates an appearance of using a single seamless computer, even though multiple computational resources and memories can be utilized according to increases or decreases in demand. In one implementation, virtualization is achieved using a provisioning tool 1140 that prepares and equips the cloud resources, such as the processing center 1134 and data storage 1138 to provide services to the users of the cloud 1130. The processing center 1134 can be a computer cluster, a data center, a main frame computer, or a server farm. In one implementation, the processing center 1134 and data storage 1138 are collocated.

Figure 12:
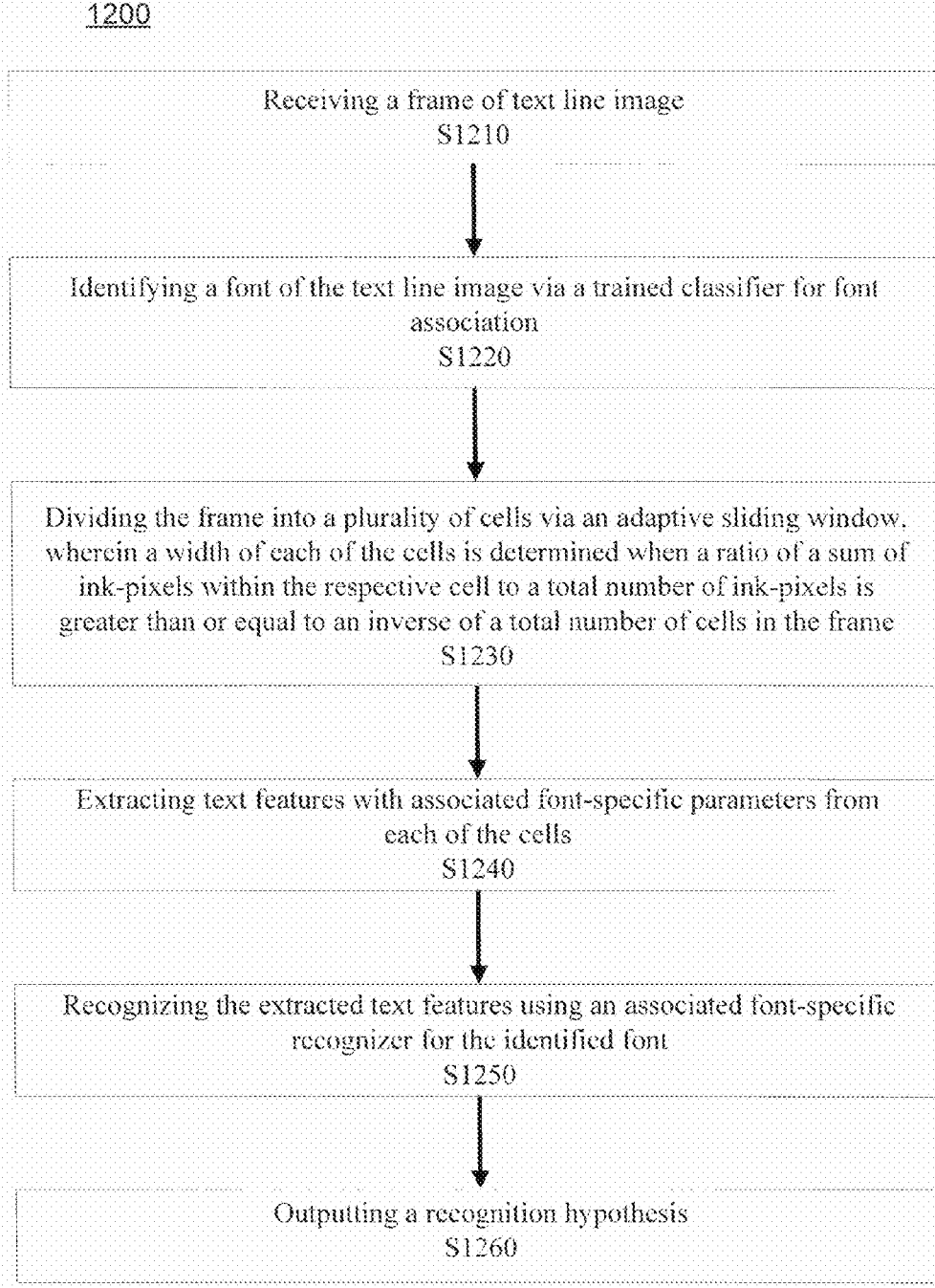
FIG. 12 is an exemplary flowchart for a method of text recognition according to an embodiment.

FIG. 12 illustrates an exemplary algorithmic flowchart for performing a method of text recognition according to one aspect of the present disclosure. The hardware description above, exemplified by any one of the structural examples shown in FIG. 8, 9, or 10, constitutes or includes specialized corresponding structure that is programmed or configured to perform the algorithm shown in FIG. 12. For example, the algorithm shown in FIG. 12 may be completely performed by the circuitry included in the single device shown in FIG. 8, or the chipset as shown in FIGS. 9 and 10, or the algorithm may be completely performed in a shared manner distributed over the circuitry of any plurality of the devices shown in FIG. 11.

The method 1200 illustrated in the algorithmic flowchart of FIG. 12 includes receiving a frame of text line image in step S1210, and identifying a font of the text line image via a trained classifier for font association in step S1220. Method 1200 also includes dividing the frame into a plurality of cells via an adaptive sliding window in step S1230. A width of each of the cells is determined when a ratio of a sum of ink-pixels within the respective cell to a total number of ink-pixels is greater than or equal to an inverse of a total number of cells in the frame. Method 1200 also includes extracting text features with associated font-specific parameters from each of the cells in step S1240, and recognizing the extracted text features using an associated font-specific recognizer for the identified font in step S1250. Method 1200 also includes outputting a recognition hypothesis in step 1260.

Method 1200 can also include locating a first cell around a prominent writing line of the text line image, locating one or more upper cells around portions of the text line image above the first cell wherein each of the one or more upper cells includes a same percentage of ink-pixels, and locating one or more lower cells around portions of the text line image below the first cell wherein each of the one or more lower cells includes a same percentage of ink-pixels in step S1230. The associated font-specific recognizer can include a trained monofont HMM recognizer selected from a plurality of trained monofont HMM recognizers. The trained classifier can include training samples from a plurality of different fonts. Method 1200 can further include associating an unseen font with the closest available font from the trained classifier, and using one or more character bigrams. A size and position of the cells can adapt to each successively-received frame of text line image according to the determined width and according to an ink-pixel distribution within each of the cells.

In a first embodiment, a text-recognition system includes a trained classifier configured with circuitry to identify a font of a frame of text line image. The system also includes an adaptive sliding window configured with circuitry to divide the frame into a plurality of cells. A first cell is located around a prominent writing line of the text line image. Additional cells are located above the prominent writing line and below the prominent writing line, such that each of the additional cells above the prominent writing line has a same percentage of ink-pixels and each of the additional cells below the prominent writing line has a same percentage of ink-pixels. The system also includes a font-specific feature parameters database configured with circuitry for extraction of text features from each of the cells. The system also includes one or more trained font-specific recognizers configured with circuitry to recognize the extracted text features using an associated font-specific recognizer for the identified font.

In the first embodiment text-recognition system, a width of the first cell and each of the additional cells can be determined when a ratio of a sum of ink-pixels within the respective cell to a total number of ink-pixels is greater than or equal to an inverse of a total number of cells in the frame. The total number of cells in the frame can be defined by 'n', a total number of cells above the writing line can be defined by 'a', and a total number of cells below the writing line can be defined by 'n-a-1'. The one or more trained font-specific recognizers can include HMM recognizers. The trained classifier can include features for font identification, wherein the features can include one or more of a maximum ink projection, a ratio of ink-pixels, a percentage increase or decrease of pixel projection, a compaction, or a count of projections above average.

In a second embodiment, a text recognition system includes circuitry configured to identify a font of a received frame of text line image from a trained classifier for font association. The circuitry is also configured to divide the received frame into a plurality of cells. A first cell is located around a prominent writing line of the text line image. One or more additional cells are located above the first cell and one or more additional cells are located below the first cell. The circuitry is also configured to extract text features from each of the cells using feature parameters specific to the identified font. The circuitry is also configured to recognize the extracted text features using a monofont recognizer specific to the identified font.

Embodiments herein describe an adaptive sliding window technique for feature extraction in text recognition. The size and position of cells of the sliding window adapt to the writing line of a text line image. Each cell is customized to achieve a uniform ink-pixel distribution across all cells for optimum text recognition. A two-step process for mixed-font text recognition associates an input text line image to a closest known font, and recognizes the text line image using a recognizer trained for that particular font. Embodiments herein were described using the Arabic script. However, the systems and methods described herein can be used for text recognition of other scripts. In particular, text recognition of printed or handwritten scripts with a prominent writing line would benefit from the embodiments described herein.

The foregoing discussion discloses and describes merely exemplary embodiments of educational system circuitry. As will be understood by those skilled in the art, the educational system circuitry devices, systems, and methods may be embodied in other specific forms without departing from the spirit or essential characteristics thereof. Accordingly, the disclosure herein is intended to be illustrative, but not limiting of the scope of the embodiments, as well as the claims. The disclosure, including any readily discernible variants of the teachings herein, define in part, the scope of the foregoing claim terminology.

The invention claimed is:

1. A text-recognition system, comprising:
   a trained classifier configured with circuitry to identify a font of a frame of text line image;
   an adaptive sliding window configured with circuitry to divide the frame into a plurality of cells, wherein a first cell is located around a prominent writing line of the text line image, and additional cells are located above the prominent writing line and below the prominent writing line such that each of the additional cells above the prominent writing line has a same percentage of ink-pixels and each of the additional cells below the prominent writing line has a same percentage of ink-pixels;
   a font-specific feature parameters database configured with circuitry for extraction of text features from each of the cells; and
   one or more trained font-specific recognizers configured with circuitry to recognize the extracted text features using an associated font-specific recognizer for the identified font.

2. The text-recognition system of claim 1, wherein a width of the first cell and each of the additional cells is determined when a ratio of a sum of ink-pixels within the respective cell to a total number of ink-pixels is greater than or equal to an inverse of a total number of cells in the frame.

3. The text-recognition system of claim 2, wherein the total number of cells in the frame is defined by 'n', a total number of cells above the writing line is defined by 'a', and a total number of cells below the writing line is defined by 'n-a-1'.

4. The text-recognition system of claim 1, wherein the one or more trained font-specific recognizers comprise Hidden Markov Model (HMM) recognizers.

5. The text-recognition system of claim 1, wherein the trained classifier includes features for font identification, the features including one or more of a maximum ink projection, a ratio of ink-pixels, a percentage increase or decrease of pixel projection, a compaction, or a count of projections above average.

6. A method of recognizing text, the method comprising:
   receiving a frame of text line image;
   identifying a font of the text line image via a trained classifier for font association;
   dividing the frame into a plurality of cells via an adaptive sliding window, wherein a width of each of the cells is determined when a ratio of a sum of ink-pixels within the respective cell to a total number of ink-pixels is greater than or equal to an inverse of a total number of cells in the frame;

extracting text features with associated font-specific parameters from each of the cells;

recognizing the extracted text features using an associated font-specific recognizer for the identified font; and outputting a recognition hypothesis.

7. The method of claim 6, wherein the dividing further comprises:

locating a first cell around a prominent writing line of the text line image;

locating one or more upper cells around portions of the text line image above the first cell, wherein each of the one or more upper cells includes a same percentage of ink-pixels; and locating one or more lower cells around portions of the text line image below the first cell, wherein each of the one or more lower cells includes a same percentage of ink-pixels.

8. The method of claim 6, wherein the associated font-specific recognizer comprises a trained monofont Hidden Markov Model (HMM) recognizer selected from a plurality of trained monofont HMM recognizers.

9. The method of claim 6, wherein the trained classifier includes training samples from a plurality of different fonts.

10. The method of claim 6, further comprising:

associating an unseen font with the closest available font from the trained classifier; and using one or more character bigrams.

11. The method of claim 6, wherein a size and position of the cells adapt to each successively-received frame of text line image according to the determined width and according to an ink-pixel distribution within each of the cells.

* * * * *